(12) United States Patent
Lyon et al.

(10) Patent No.: US 10,364,809 B2
(45) Date of Patent: *Jul. 30, 2019

(54) SENSORS, MULTIPLEXED COMMUNICATION TECHNIQUES, AND RELATED SYSTEMS

(71) Applicant: COOLIT SYSTEMS, INC., Calgary (CA)

(72) Inventors: Geoff Sean Lyon, Calgary (CA); Mike Holden, Calgary (CA)

(73) Assignee: CoolIT Systems, Inc., Calgary (CA)

( * ) Notice: Subject to any disclaimer, the term of this patent is extended or adjusted under 35 U.S.C. 154(b) by 435 days.

This patent is subject to a terminal disclaimer.

(21) Appl. No.: 14/777,510

(22) PCT Filed: Mar. 14, 2014

(86) PCT No.: PCT/IB2014/059768
§ 371 (c)(1),
(2) Date: Sep. 15, 2015

(87) PCT Pub. No.: WO2014/141162
PCT Pub. Date: Sep. 18, 2014

(65) Prior Publication Data
US 2016/0281704 A1 Sep. 29, 2016

Related U.S. Application Data

(60) Provisional application No. 61/880,081, filed on Sep. 19, 2013, provisional application No. 61/856,566, (Continued)

(51) Int. Cl.
F04B 49/06 (2006.01)
G06F 1/20 (2006.01)
(Continued)

(52) U.S. Cl.
CPC ............ F04B 49/065 (2013.01); G01F 1/103 (2013.01); G01M 3/165 (2013.01); G01M 3/18 (2013.01);
(Continued)

(58) Field of Classification Search
CPC .... G05D 7/0635; G05D 1/206; F04B 49/065; G01F 1/103
See application file for complete search history.

(56) References Cited

U.S. PATENT DOCUMENTS 3,073,385 A 1/1963 Peters
3,481,393 A 12/1969 Chu
(Continued)

FOREIGN PATENT DOCUMENTS

CN 102483242 A 5/2012
DE 20 2012 002 974 U1 7/2012
(Continued)

OTHER PUBLICATIONS

Final Office Action in U.S. Appl. No. 15/354,928, dated Oct. 9, 2018, 9 pages.
(Continued)

Primary Examiner — Vincent H Tran
(74) Attorney, Agent, or Firm — Ganz Pollard, LLC

(57) ABSTRACT

An observed operational state can include an operational state of one or more system devices. A sensor can emit, in response to a detected observable condition reflective of a given operational state, a simulated signal reflective of a different operational state as a proxy for the detected condition. A controller receiving such a proxy signal can, at least partially responsively to the proxy signal, issue a command corresponding to the given operational state. For example, a leak detector can emit in response to a detected leak, or a flow-rate sensor can emit in response to a detected flow-rate (Continued)

of a liquid, a simulated fan-speed tachometer signal representative of a selected fan speed. At least partially in response to observing a simulated tachometer signal, a controller can issue a system command corresponding to an underlying system condition for which the simulated tachometer signal is a proxy.

48 Claims, 14 Drawing Sheets

Related U.S. Application Data filed on Jul. 19, 2013, provisional application No. 61/805,418, filed on Mar. 26, 2013, provisional application No. 61/793,479, filed on Mar. 15, 2013.

(51) Int. Cl.
    *G01F 1/10*       (2006.01)
    *G01M 3/16*      (2006.01)
    *G01M 3/18*      (2006.01)
    *G01M 3/28*      (2006.01)
    *G05B 17/02*     (2006.01)

(52) U.S. Cl.
    CPC ........... *G01M 3/2807* (2013.01); *G05B 17/02* (2013.01); *G06F 1/20* (2013.01); *G06F 2200/201* (2013.01)

(56) References Cited

U.S. PATENT DOCUMENTS

| | | | |
|---|---|---|---|
| 3,939,328 A | 2/1976 | Davis | |
| 4,340,111 A | 7/1982 | Skala | |
| 4,450,472 A | 5/1984 | Tuckerman et al. | |
| 4,520,298 A | 5/1985 | Abbondanti | |
| 4,561,040 A | 12/1985 | Eastman et al. | |
| 4,564,040 A | 1/1986 | Rudelick | |
| 4,750,086 A | 6/1988 | Mittal | |
| 4,758,926 A | 7/1988 | Herrell et al. | |
| 4,768,581 A | 9/1988 | Gotwald et al. | |
| 4,777,578 A | 10/1988 | Jahns | |
| 4,898,153 A | 2/1990 | Sherwood | |
| 4,909,315 A | 3/1990 | Nelson et al. | |
| 4,940,085 A | 7/1990 | Nelson et al. | |
| 5,016,090 A | 5/1991 | Galyon et al. | |
| 5,070,936 A | 12/1991 | Carroll et al. | |
| 5,099,311 A | 3/1992 | Bonde et al. | |
| 5,142,214 A | 8/1992 | Purson et al. | |
| 5,203,401 A | 4/1993 | Hamburgen et al. | |
| 5,218,515 A | 6/1993 | Bernhardt | |
| 5,265,670 A | 11/1993 | Zingher | |
| 5,294,830 A | 3/1994 | Young et al. | |
| 5,309,319 A | 5/1994 | Messina | |
| 5,441,102 A | 8/1995 | Burward-Hoy | |
| 5,453,641 A | 9/1995 | Mundinger et al. | |
| 5,522,452 A | 6/1996 | Mizuno et al. | |
| 5,535,818 A | 7/1996 | Fujisaki et al. | |
| 5,592,363 A | 1/1997 | Atarashi et al. | |
| 5,628,199 A | 5/1997 | Hoglund et al. | |
| 5,636,653 A * | 6/1997 | Titus ..................... G01F 1/34 |
| | | | 137/14 |
| 5,646,824 A | 7/1997 | Ohashi et al. | |
| 5,684,671 A | 11/1997 | Hobbs et al. | |
| 5,727,618 A | 3/1998 | Mundinger et al. | |
| 5,731,954 A | 3/1998 | Cheon | |
| 5,823,249 A | 10/1998 | Batchelder | |
| 5,835,347 A | 11/1998 | Chu | |
| 5,864,464 A | 1/1999 | Lin | |
| 5,875,637 A | 3/1999 | Paetow | |
| 5,998,240 A | 12/1999 | Hamilton et al. | |
| 6,019,165 A | 2/2000 | Batchelder | |
| 6,035,655 A | 3/2000 | Hare et al. | |
| 6,256,378 B1 | 7/2001 | Iggulden et al. | |
| 6,327,145 B1 | 12/2001 | Lian et al. | |
| 6,330,525 B1 | 12/2001 | Hays et al. | |
| 6,415,853 B1 | 7/2002 | Tao et al. | |
| 6,415,860 B1 | 7/2002 | Kelly et al. | |
| 6,447,270 B1 | 9/2002 | Schmidt et al. | |
| 6,470,289 B1 | 10/2002 | Peters et al. | |
| 6,679,315 B2 | 1/2004 | Cosley et al. | |
| 6,702,002 B2 | 3/2004 | Wang | |
| 6,769,258 B2 | 8/2004 | Pierson | |
| 6,775,137 B2 | 8/2004 | Chu et al. | |
| 6,792,373 B2 | 9/2004 | Tabor | |
| 6,819,563 B1 | 11/2004 | Chu et al. | |
| 6,827,128 B2 | 12/2004 | Philpott et al. | |
| 6,883,347 B2 | 4/2005 | Ayub | |
| 6,952,345 B2 | 10/2005 | Weber et al. | |
| 6,970,355 B2 | 11/2005 | Ellsworth, Jr. et al. | |
| 6,973,801 B1 | 12/2005 | Campbell et al. | |
| 6,986,382 B2 | 1/2006 | Upadhya et al. | |
| 6,988,534 B2 | 1/2006 | Kenny et al. | |
| 6,993,421 B2 | 1/2006 | Pillar et al. | |
| 7,000,684 B2 | 2/2006 | Kenny et al. | |
| 7,007,506 B2 | 3/2006 | Kubo et al. | |
| 7,012,807 B2 | 3/2006 | Chu et al. | |
| 7,021,367 B2 | 4/2006 | Oikawa | |
| 7,029,647 B2 | 4/2006 | Tonkovich et al. | |
| 7,032,651 B2 | 4/2006 | Winslow et al. | |
| 7,044,198 B2 | 5/2006 | Matsushima et al. | |
| 7,057,893 B2 | 6/2006 | Nicolai et al. | |
| 7,086,247 B2 | 8/2006 | Campbell et al. | |
| 7,104,312 B2 | 9/2006 | Goodson et al. | |
| 7,123,996 B2 | 10/2006 | Fukushima et al. | |
| 7,124,811 B2 | 10/2006 | Crocker et al. | |
| 7,131,486 B2 | 11/2006 | Goodson et al. | |
| 7,143,816 B1 | 12/2006 | Ghosh et al. | |
| 7,149,084 B2 | 12/2006 | Matsushima et al. | |
| 7,156,159 B2 | 1/2007 | Lovette et al. | |
| 7,190,580 B2 | 3/2007 | Bezama et al. | |
| 7,201,217 B2 | 4/2007 | Johnson et al. | |
| 7,206,203 B2 | 4/2007 | Campbell et al. | |
| 7,209,355 B2 | 4/2007 | Koga et al. | |
| 7,221,270 B2 | 5/2007 | Chen et al. | |
| 7,264,359 B2 | 9/2007 | Kawahara et al. | |
| 7,274,566 B2 | 9/2007 | Campbell et al. | |
| 7,278,273 B1 | 10/2007 | Whitted et al. | |
| 7,301,771 B2 | 11/2007 | Hata et al. | |
| 7,315,448 B1 | 1/2008 | Bash et al. | |
| 7,318,322 B2 | 1/2008 | Ota et al. | |
| 7,331,378 B2 | 2/2008 | Bhatti et al. | |
| 7,360,582 B2 | 4/2008 | Olesen | |
| 7,397,661 B2 | 7/2008 | Campbell et al. | |
| 7,455,103 B2 | 11/2008 | Sato et al. | |
| 7,466,549 B2 | 12/2008 | Dorrich et al. | |
| 7,466,553 B2 | 12/2008 | Hamman | |
| 7,484,530 B2 | 2/2009 | Harvey et al. | |
| 7,486,513 B2 | 2/2009 | Hall et al. | |
| 7,527,085 B2 | 5/2009 | Iijima et al. | |
| 7,591,302 B1 | 9/2009 | Lenehan et al. | |
| 7,599,184 B2 | 10/2009 | Upadhya et al. | |
| 7,639,499 B1 | 12/2009 | Campbell et al. | |
| 7,688,589 B2 | 3/2010 | Chiang | |
| 7,757,506 B2 | 7/2010 | Ellsworth, Jr. et al. | |
| 7,762,314 B2 | 7/2010 | Campbell et al. | |
| 7,791,882 B2 | 9/2010 | Chu et al. | |
| 7,806,168 B2 | 10/2010 | Upadhya et al. | |
| 7,905,106 B2 | 3/2011 | Attlesey | |
| 7,925,746 B1 | 4/2011 | Melton | |
| 7,944,694 B2 | 5/2011 | Campbell et al. | |
| 7,957,144 B2 | 6/2011 | Goettert et al. | |
| 7,961,465 B2 | 6/2011 | Goldrian et al. | |
| 7,969,727 B2 | 6/2011 | Tozer et al. | |
| 7,971,632 B2 | 7/2011 | Eriksen | |
| 7,978,472 B2 | 7/2011 | Campbell et al. | |
| 8,051,898 B2 | 11/2011 | Chiang | |
| 8,066,057 B2 | 11/2011 | Olesen | |
| 8,240,362 B2 | 8/2012 | Eriksen | |
| 8,245,764 B2 | 8/2012 | Eriksen | |
| 8,250,879 B2 | 8/2012 | MacBain et al. | |
| 8,427,831 B2 | 4/2013 | Wei | |
| 8,437,129 B2 | 5/2013 | Tung et al. | |

(56) References Cited

U.S. PATENT DOCUMENTS

| | | |
|---|---|---|
| 8,441,789 B2 | 5/2013 | Wu et al. |
| 8,493,738 B2 | 7/2013 | Chainer et al. |
| 8,499,761 B2 * | 8/2013 | Jorczak .............. A61M 16/00 128/204.21 |
| 8,631,860 B2 | 1/2014 | Tang et al. |
| 8,724,315 B2 | 5/2014 | Branton |
| 8,746,330 B2 | 6/2014 | Lyon |
| 9,052,252 B2 | 6/2015 | Lyon et al. |
| 9,057,567 B2 | 6/2015 | Lyon |
| 9,453,691 B2 | 9/2016 | Lyon |
| 9,496,200 B2 | 11/2016 | Lyon et al. |
| 9,603,284 B2 | 3/2017 | Lyon |
| 2002/0070007 A1 | 6/2002 | Calaman et al. |
| 2002/0153885 A1 * | 10/2002 | Blossfeld .......... G01R 33/0354 324/248 |
| 2002/0189790 A1 | 12/2002 | Wong |
| 2003/0019234 A1 | 1/2003 | Wayburn et al. |
| 2003/0070792 A1 | 4/2003 | Tanaka et al. |
| 2003/0085028 A1 | 5/2003 | Galtz |
| 2003/0151130 A1 | 8/2003 | Cheon |
| 2003/0230400 A1 | 12/2003 | McCordic et al. |
| 2004/0008483 A1 | 1/2004 | Cheon |
| 2004/0040695 A1 | 3/2004 | Chesser et al. |
| 2004/0042171 A1 | 3/2004 | Takamatsu et al. |
| 2004/0042172 A1 | 3/2004 | Kusaka et al. |
| 2004/0057211 A1 | 3/2004 | Kondo et al. |
| 2004/0100770 A1 | 5/2004 | Chu et al. |
| 2004/0104010 A1 | 6/2004 | Kenny et al. |
| 2004/0104012 A1 | 6/2004 | Zhou et al. |
| 2004/0104022 A1 | 6/2004 | Kenny et al. |
| 2004/0112585 A1 | 6/2004 | Goodson et al. |
| 2004/0123614 A1 | 7/2004 | Stewart |
| 2004/0160741 A1 * | 8/2004 | Moss ..................... G06F 1/20 361/699 |
| 2004/0182548 A1 | 9/2004 | Lovette et al. |
| 2004/0182560 A1 | 9/2004 | Kenny et al. |
| 2004/0188066 A1 | 9/2004 | Upadhya et al. |
| 2004/0188069 A1 * | 9/2004 | Tomioka ............... G06F 1/203 165/104.33 |
| 2004/0206477 A1 | 10/2004 | Kenny et al. |
| 2004/0221604 A1 | 11/2004 | Ota et al. |
| 2004/0240179 A1 | 12/2004 | Koga et al. |
| 2005/0069432 A1 | 3/2005 | Tomioka |
| 2005/0126747 A1 | 6/2005 | Chu et al. |
| 2005/0128705 A1 | 6/2005 | Chu et al. |
| 2005/0178531 A1 | 8/2005 | Huang et al. |
| 2005/0180107 A1 | 8/2005 | Naganawa et al. |
| 2005/0205241 A1 | 9/2005 | Goodson et al. |
| 2005/0211417 A1 | 9/2005 | Upadhya et al. |
| 2005/0241809 A1 | 11/2005 | Tomioka et al. |
| 2005/0259397 A1 | 11/2005 | Bash et al. |
| 2005/0269061 A1 | 12/2005 | Brewer et al. |
| 2006/0002080 A1 | 1/2006 | Leija et al. |
| 2006/0002088 A1 | 1/2006 | Bezama et al. |
| 2006/0011329 A1 | 1/2006 | Wang et al. |
| 2006/0096738 A1 | 5/2006 | Kang et al. |
| 2006/0096740 A1 | 5/2006 | Zheng |
| 2006/0096743 A1 | 5/2006 | Lee et al. |
| 2006/0137863 A1 | 6/2006 | Lee et al. |
| 2006/0143439 A1 | 6/2006 | Arumugam et al. |
| 2006/0162903 A1 | 7/2006 | Bhatti et al. |
| 2006/0171801 A1 | 8/2006 | Manabe et al. |
| 2006/0185829 A1 | 8/2006 | Duan et al. |
| 2006/0185830 A1 | 8/2006 | Duan |
| 2006/0187638 A1 * | 8/2006 | Vinson ..................... G06F 1/20 361/698 |
| 2006/0225867 A1 | 10/2006 | Park et al. |
| 2006/0231238 A1 | 10/2006 | Ball, Jr. |
| 2006/0254755 A1 | 11/2006 | Chen et al. |
| 2007/0029069 A1 | 2/2007 | Duan |
| 2007/0034356 A1 | 2/2007 | Kenny et al. |
| 2007/0039719 A1 | 2/2007 | Eriksen |
| 2007/0095512 A1 | 5/2007 | Chen et al. |
| 2007/0107886 A1 | 5/2007 | Chen |
| 2007/0125526 A1 | 6/2007 | Satou et al. |
| 2007/0131396 A1 | 6/2007 | Yu et al. |
| 2007/0163750 A1 | 7/2007 | Bhatti et al. |
| 2007/0193724 A1 | 8/2007 | Lin |
| 2007/0227704 A1 | 10/2007 | Nagai et al. |
| 2007/0227710 A1 | 10/2007 | Belady et al. |
| 2007/0256957 A1 | 11/2007 | Herrmann et al. |
| 2007/0272314 A1 | 11/2007 | Packham |
| 2007/0272392 A1 | 11/2007 | Ghosh et al. |
| 2007/0297136 A1 | 12/2007 | Konshak |
| 2008/0053641 A1 | 3/2008 | Lai et al. |
| 2008/0128114 A1 | 6/2008 | Lai et al. |
| 2008/0179045 A1 | 7/2008 | Hu et al. |
| 2008/0205003 A1 | 8/2008 | Belady |
| 2008/0225478 A1 | 9/2008 | Goettert et al. |
| 2008/0288124 A1 * | 11/2008 | Huang ................ G05D 23/32 700/300 |
| 2008/0304236 A1 | 12/2008 | Murakami et al. |
| 2009/0071625 A1 | 3/2009 | Lyon |
| 2009/0101315 A1 | 4/2009 | Cheng |
| 2009/0120622 A1 | 5/2009 | Koch |
| 2009/0139698 A1 | 6/2009 | Robinson |
| 2009/0154096 A1 | 6/2009 | Iyengar et al. |
| 2009/0228893 A1 | 9/2009 | Behrendt et al. |
| 2009/0306833 A1 * | 12/2009 | Vinson .................. G05D 23/19 700/282 |
| 2009/0322543 A1 | 12/2009 | Crnkovich et al. |
| 2010/0065355 A1 | 3/2010 | Reddy |
| 2010/0085708 A1 | 4/2010 | Martin et al. |
| 2010/0101765 A1 | 4/2010 | Campbell et al. |
| 2010/0103620 A1 | 4/2010 | Campbell et al. |
| 2010/0139887 A1 | 6/2010 | Slessman |
| 2010/0179695 A1 | 7/2010 | Collins et al. |
| 2010/0182809 A1 | 7/2010 | Cullinane et al. |
| 2010/0206869 A1 | 8/2010 | Nelson et al. |
| 2010/0211669 A1 | 8/2010 | Dalgas et al. |
| 2010/0324962 A1 | 12/2010 | Nesler et al. |
| 2010/0326634 A1 | 12/2010 | Eriksen |
| 2011/0084839 A1 | 4/2011 | Groth et al. |
| 2011/0100045 A1 | 5/2011 | Carlson |
| 2011/0100618 A1 | 5/2011 | Carlson |
| 2011/0115223 A1 | 5/2011 | Stahlkopf et al. |
| 2011/0127027 A1 | 6/2011 | Kashirajima et al. |
| 2011/0154842 A1 | 6/2011 | Heydari et al. |
| 2011/0168379 A1 | 7/2011 | Morgan et al. |
| 2011/0174001 A1 | 7/2011 | Carlson et al. |
| 2011/0175498 A1 | 7/2011 | Bash et al. |
| 2011/0303394 A1 | 12/2011 | Branton |
| 2011/0313576 A1 * | 12/2011 | Nicewonger ........... F28D 15/00 700/282 |
| 2012/0103009 A1 | 5/2012 | Ding et al. |
| 2012/0147553 A1 | 6/2012 | Eriksen |
| 2012/0152498 A1 | 6/2012 | Lyon |
| 2012/0175094 A1 | 7/2012 | Rice |
| 2012/0271567 A1 * | 10/2012 | Da Pont ................. G01F 1/075 702/45 |
| 2012/0273159 A1 | 11/2012 | Eriksen |
| 2013/0025818 A1 | 1/2013 | Lyon et al. |
| 2013/0107453 A1 | 5/2013 | Chainer et al. |
| 2013/0288630 A1 * | 10/2013 | Suzuki ................. H03G 3/3052 455/232.1 |
| 2014/0103950 A1 * | 4/2014 | Janitch ................. G01F 23/284 324/754.06 |
| 2014/0158326 A1 | 6/2014 | Lyon |
| 2014/0186156 A1 * | 7/2014 | Lai ......................... F04D 27/004 415/30 |
| 2014/0251582 A1 | 9/2014 | Lyon |
| 2014/0262180 A1 | 9/2014 | Lyon et al. |
| 2014/0266744 A1 * | 9/2014 | Lyon ......................... G01M 3/18 340/605 |
| 2015/0083368 A1 | 3/2015 | Lyon |
| 2015/0108934 A1 * | 4/2015 | Wong ................. F04D 25/0613 318/472 |
| 2015/0168474 A1 * | 6/2015 | Yoshioka ............ G01R 31/025 702/58 |
| 2015/0355630 A1 | 12/2015 | Cader et al. |
| 2016/0281704 A1 | 9/2016 | Lyon et al. |

(56) References Cited

U.S. PATENT DOCUMENTS

| | | |
|---|---|---|
| 2016/0377355 A1 | 12/2016 | Lyon |
| 2017/0064874 A1 | 3/2017 | Lyon et al. |
| 2017/0196116 A1 | 7/2017 | Lyon |

FOREIGN PATENT DOCUMENTS

| | | | |
|---|---|---|---|
| EP | 1 808 892 A2 | 7/2007 | |
| JP | 61-32449 A | 2/1986 | |
| JP | 06-120387 A | 4/1994 | |
| JP | 7-183678 A | 7/1995 | |
| JP | 10-173114 A | 6/1998 | |
| JP | 2001-255027 A | 9/2001 | |
| JP | 2002-151638 A | 5/2002 | |
| JP | 2003-243581 A | 8/2003 | |
| JP | 2005-351600 A | 12/2005 | |
| JP | 2007-180505 A | 7/2007 | |
| JP | 2007-227902 A | 9/2007 | |
| JP | 2007-531991 A | 11/2007 | |
| JP | 2008-140879 A | 6/2008 | |
| JP | 2009-529621 A | 8/2009 | |
| JP | 2011-114206 A | 6/2011 | |
| JP | 3179086 U | 10/2012 | |
| TW | M273031 U | 8/2005 | |
| TW | M298733 U | 10/2006 | |
| TW | I266039 B | 11/2006 | |
| TW | 201305522 A1 | 2/2013 | |
| TW | 201320883 A | 5/2013 | |
| TW | 201441626 A | 11/2014 | |
| WO | 01/65900 A1 | 9/2001 | |
| WO | 03/055055 A1 | 7/2003 | |
| WO | 2005/017468 A2 | 2/2005 | |
| WO | 2005/096377 A1 | 10/2005 | |
| WO | 2006/052317 A2 | 5/2006 | |
| WO | 2007/029253 A2 | 3/2007 | |
| WO | 2014/141162 A1 | 9/2014 | |

OTHER PUBLICATIONS

Ellsworth, M.J. Jr. et al., "The Evolution of Water Cooling for IBM Large Server Systems: Back to the Future," IEEE, CoolIT Systems Inc. Exhibit 1017, pp. 1-9, (2008).
Ellsworth, M.J. Jr. P.E., "Thermal Design and Implementation of Robust Liquid Cooling Systems for High Performance Computer Systems," Systems and Technology Group, IBM, InterPACK '11, dated Jul. 6-8, 2011, pp. 1-64.
Kandlikar, S.G., "High Flux Heat Removal with Microchannels. A Roadmap of Challenges and Opportunities," Heat Transfer Engineering. vol. 26 No. 8 : 5-14, (2005), pp. 5-14.
Knight, R.W., et al., "Heat Sink Optimization with Application to Microchannels," IEEE Transactions on Components, Hybrids, and Manufacturing Technology, vol. 15, No. 5, Oct. 1992, pp. 832-842.
Merriam-webster definition of beveled, dated Jan. 26, 2016, retrieved from internet URL: http://www.merriam-webster.com/dictionary/beveled, pp. 1-4.
Schmidt, R.R., "Liquid Cooling is Back," Electronics Cooling Magazine, Published Aug. 1, 2005, Retrieved from the Internet URL: https://www.electronics-cooling.com/2005/08/liquid-cooling-is-back/, on Apr. 30, 2014, pp. 1-7.
Steinke, M., and Kandlikar, S.G., "Single-Phase Heat Transfer Enhancement Techniques in Microchannel and Minichannels Flows," Microchannels and Minichannels—2004, published on Jun. 17-19, 2004, Rochaster, New York, pp. 1-8.
Torres, G., "CoolIT Water-Cooling Products," Published Jan. 14, 2008, Retrieved from Internet URL: http://www.hardwaresecrets.com/coolit-water-cooling-products/3/, on Apr. 24, 2014, pp. 1-9.
Vertal, L., "Water Cooling Comes of Age, Again," Asetek Data Center Liquid Cooling, Published on Oct. 11, 2013, Retrieved from the Internet URL: htt5s://www.aseteck.com/press-room/blog/2013/water-cooling-comes-of-age-again/, on Nov. 9, 2015, pp. 1-4.
Examination Report in European Patent Application No. 07075014.6, dated Mar. 11, 2011.

Requirement Restriction for U.S. Appl. No. 12/189,476, dated Jan. 24, 2012.
Non-Final Office Action for U.S. Appl. No. 12/189,476, dated Apr. 13, 2012.
English translation of Office Action for Japanese Application No. 2012-002117, dated May 7, 2012.
Final Office Action for U.S. Appl. No. 12/189,476, dated Jan. 7, 2013.
English translation of Technical Opinion for Japanese Utility Model Application No. 2012-002117, dated Jan. 10, 2013 (Registration No. 3179086).
English translation of Second Technical Opinion for Japanese Utility Model Application No. 2012-002117 dated Jul. 19, 2013 (Registration No. 3179086).
English translation of Chinese-language Search and Examination Reports for Taiwan Patent Application No. 101110072 dated Apr. 9, 2014.
Notice of Allowance for U.S. Appl. No. 12/189,476, dated Apr. 28, 2014.
Restriction Requirement for U.S. Appl. No. 14/183,443, dated May 22, 2014.
Restriction Requirement for U.S. Appl. No. 14/210,165, dated Jun. 12, 2014.
Restriction Requirement for U.S. Appl. No. 14/283,163, dated Jun. 13, 2014.
International Search Report and Written Opinion for PCT Application No. PCT/IB2014/059768, dated Jul. 9, 2014.
Petition for Inter Partes Review of U.S. Pat. No. 8,749,968; United States Patent and Trademark Office, Before the 5 Patent Trial and Appeal Board, *CoolIT Systems, Inc.* v. *Asetek A/S*, Inter Partes Review No. 2014-01172, Jul. 16, 2014; 61 pages.
Requirement Restriction for U.S. Appl. No. 13/401,618, dated Sep. 18, 2014.
Non-Final Office Action for U.S. Appl. No. 14/210,165, dated Sep. 29, 2014.
Non-Final Office Action for U.S. Appl. No. 14/283,163, dated Sep. 30, 2014.
Non-Final Office Action for U.S. Appl. No. 14/183,443, dated Oct. 30, 2014.
Restriction Requirement for U.S. Appl. No. 13/559,340, dated Oct. 31, 2014.
English Translation of Examination and Search Report for Taiwan Application No. 103109612, dated Jan. 1, 2015.
Third Party Preissuance Submission for U.S. Appl. No. 13/559,340, mailed Jan. 9, 2015.
Preissuance submission for U.S. Appl. No. 13/401,618, mailed Jan. 9, 2015.
Ex Parte Quayle Action for U.S. Appl. No. 14/210,165, mailed Feb. 5, 2015.
Restriction Requirement for U.S. Appl. No. 14/550,952, dated Feb. 5, 2015.
Notice of Allowance for U.S. Appl. No. 14/210,165, dated Feb. 20, 2015.
Non-Final Office Action for U.S. Appl. No. 13/559,340, dated Mar. 26, 2015.
Notice of Allowance for U.S. Appl. No. 14/183,443, dated Apr. 30, 2015.
Final Office Action for U.S. Appl. No. 14/283,163, dated May 14, 2015.
English Translation of Examination and Search Report for Taiwan Application No. 101127180, dated May 21, 2015.
Petition for Inter Parties Review of U.S. Pat. No. 8,746,330 in *Asetek Danmark A/S* v. *CoolIT Systems Inc.* filed May 27, 2015.
Declaration of Dr. Donald Tilton (including his CV) from Petition for Inter Parties Review of U.S. Pat. No. 8,746,330 in *Asetek Danmark A/S* v. *CoolIT Systems Inc.* dated May 27, 2015.
Non-Final Office Action for U.S. Appl. No. 14/550,952, dated Jul. 7, 2015.
Non-Final Office Action for U.S. Appl. No. 13/401,618, dated Jul. 28, 2015.
Advisory Action for U.S. Appl. No. 14/283,163, dated Aug. 3, 2015.
Non-Final Action for U.S. Appl. No. 14/283,163, dated Sep. 4, 2015.

(56) References Cited

OTHER PUBLICATIONS

Final Office Action for U.S. Appl. No. 13/559,340, dated Sep. 8, 2015.
Office Action for Taiwan Application No. 103109612, dated Sep. 21, 2015.
Final Office Action for U.S. Appl. No. 14/550,952, dated Oct. 20, 2015.
Advisory Action for U.S. Appl. No. 13/559,340, dated Dec. 2, 2015.
Osinski, United States Patent and Trademark Office Decision of Institution of Inter Partes Review. Filed Dec. 9, 2015 in Case IPR2015-01276.
English translation of Notice of Allowance in Taiwan Application No. 103109612, dated Dec. 11, 2015.
Non-Final Office Action in U.S. Appl. No. 15/351,362, dated Feb. 7, 2019, 20 pages.
Non-Final Office Action for U.S. Appl. No. 13/559,340, dated Jan. 15, 2016.
Final Office Action for U.S. Appl. No. 13/401,618, dated Jan. 26, 2016.
English translation of Notice of Allowance in Taiwan Application No. 101127180, dated Feb. 19, 2016.
Pollard, United States Patent and Trademark Office Patent Owner's Response. Filed Mar. 9, 2016 in Case PR2015-01276.
Final Office Action for U.S. Appl. No. 14/283,163, dated Jun. 15, 2016.
Notice of Allowance for U.S. Appl. No. 13/401,618, dated Jul. 27, 2016.
Restriction Requirement for U.S. Appl. No. 14/217,080, dated Sep. 21, 2016.
Notice of Allowance for U.S. Appl. No. 13/559,340, dated Sep. 23, 2016.
USPTO Patent Trial and Appeal Board Final Written Decision in Case IPR2015-01276 dated Dec. 8, 2016.
Notice of Allowance for U.S. Appl. No. 14/283,163, dated Jan. 19, 2017.
English translation of Examination Report in Taiwan Application No. 101110072, dated Feb. 8, 2017.
Non-Final Office Action for U.S. Appl. No. 15/263,210, dated Feb. 10, 2017.
Non-Final Office Action for U.S. Appl. No. 14/217,080, dated Mar. 9, 2017.
Non-Final Office Action for U.S. Appl. No. 15/462,753, dated May 11, 2017.
English translation of Notice of Allowance in Taiwan Application No. 101110072, dated Aug. 17, 2017.
Final Office Action for U.S. Appl. No. 15/462,753, dated Sep. 15, 2017.
Notice of Allowance for U.S. Appl. No. 15/263,210, dated Oct. 30, 2017.
Notice of Allowance for U.S. Appl. No. 14/217,080, dated Nov. 1, 2017.

* cited by examiner

| PIN | NAME |
|---|---|
| 1 | GND | → TO/FROM PUMP
| 2 | + 12 V DC | → TO PUMP MOTOR
| 3 | FG (SENSE) | ← TACHOMETER SIGNAL FROM PUMP
| 4 | PWM (CONTROL) | → TO PUMP CONTROLLER

FIG. 3

| PIN | NAME |
|---|---|
| 1 | GND |
| 2 | + 12 V DC |
| 3 | FG (SENSE) |
| 4 | PWM (CONTROL) |

129 ← SIMULATED TACHOMETER SIGNAL

FIG. 7

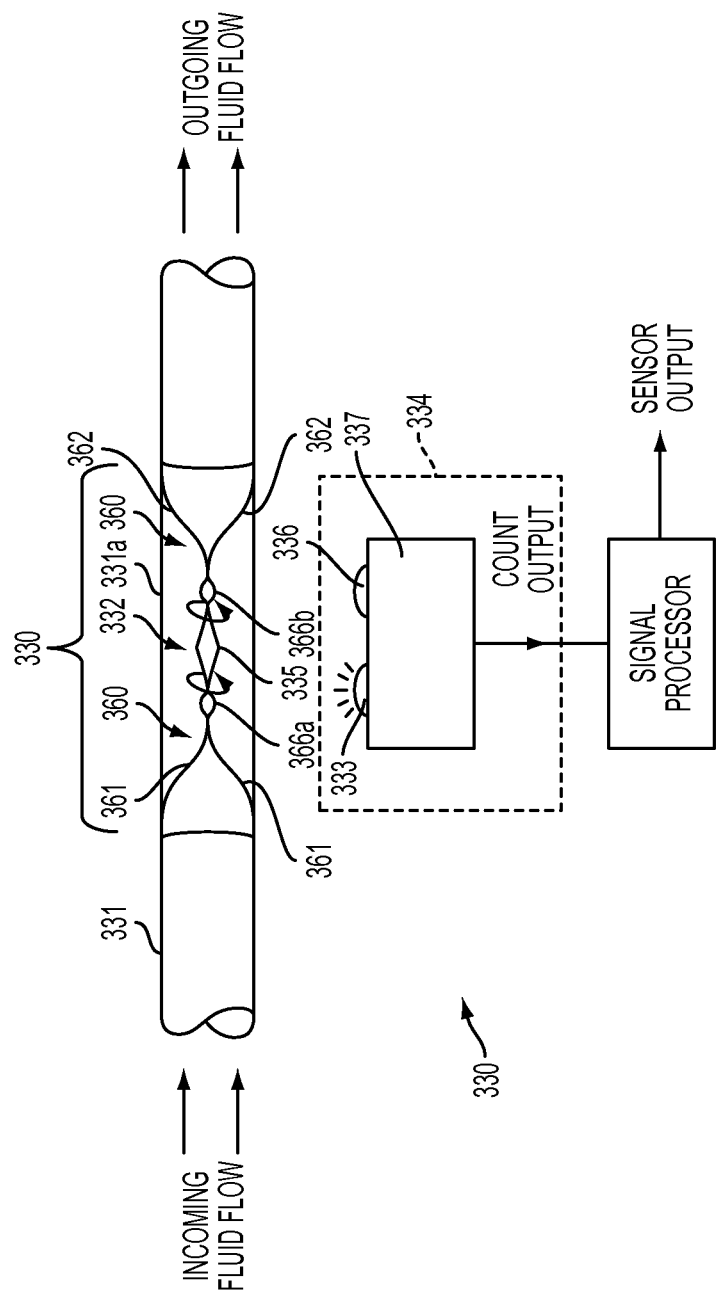
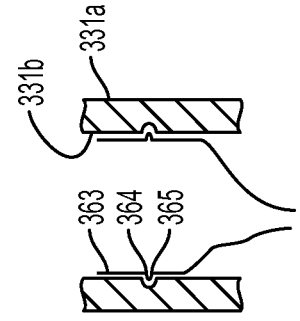
FIG. 11
FIG. 12

SENSORS, MULTIPLEXED COMMUNICATION TECHNIQUES, AND RELATED SYSTEMS

RELATED APPLICATIONS

This U.S. National Phase patent application is filed pursuant to 35 U.S.C. § 371(b) from International Patent Application No. PCT/IB2014/059768, filed on Mar. 14, 2014, and claims the benefit of and priority to U.S. Patent Application No. 61/793,479, filed Mar. 15, 2013, U.S. Patent Application No. 61/805,418, filed Mar. 26, 2013, U.S. Patent Application No. 61/856,566, filed Jul. 19, 2013, U.S. Patent Application No. 61/880,081, filed Sep. 19, 2013, each of which patent applications is hereby incorporated by reference in its respective entirety as fully as if fully recited in full herein, for all purposes.

BACKGROUND

The innovations and related subject matter disclosed herein (collectively referred to as the "disclosure") pertain to control systems, and more particularly, but not exclusively, to detectors configured to issue an alert or a command to a controller in response to a detected change in state of a given system, with a leak detector configured to respond to a detected leak of a working fluid from a liquid-based heat transfer system being but one example of disclosed detectors and related innovations, and with a flow-rate sensor configured to detect a rate of flow of a fluid through a conduit, for example an optical flow-rate sensor, being but one other example of disclosed sensors and related innovations. Some detectors and control systems are described in relation to cooling systems for electronic devices by way of example. Nonetheless, one or more of the innovations disclosed herein can be suitable for use in a variety of other control-system applications, as will be understood by those of ordinary skill in the art following a review of the present disclosure.

Computer system performance and heat dissipation density continue to increase. Consequently, conventional air-cooling is giving way to liquid-cooling in some computer system applications, including, but not exclusively, server and data center applications. Although commercially available liquid cooling systems are considered to be reliable and to provide known and repeatable performance, an automated approach for detecting an unlikely leak might be desirable in some applications. However, commercially available moisture sensors and leak detectors are not compatible with existing control systems for computer systems.

Also, approaches for monitoring a rate of flow of a fluid through one or more conduits might be desirable in some applications. For example, a rate of heat transfer through a liquid-to-liquid or an air-to-liquid (or a liquid-to-air) heat exchanger can correspond to a rate of flow of a heat transfer medium (e.g., a liquid coolant) through the heat exchanger. As but one other example, a substantial excursion of fluid flow rate through a conduit can indirectly indicate a leak upstream of the conduit, or a change in heat-transfer performance.

However, many commercially available flow-rate sensors are generally considered to be incompatible with existing liquid-cooling systems suitable for computer systems. For example, some known flow-rate sensors are typically too large, too expensive, or both, to be incorporated into liquid-cooling systems suitable for widespread commercialization in connection with cooling systems for computer systems, or other systems.

Accordingly, there remains a need for sensors configured to detect a leak from a liquid cooling system. There also remains a need for a monitoring system configured to initiate an alert responsive to a leak detected by the leak detector. A need also remains for a leak detector configured to be compatible with a control system for a computer system or other computing environment. And, there remains a need for flow-rate sensors configured to detect or sense a rate of flow of a working fluid through a conduit, for example, a portion of a flow path through a portion of a liquid-cooling system. There remains a further need for flow sensors to emit a signal responsive to a detected or a sensed flow rate of the working fluid.

There also remains a need for such sensors to be compatible with existing communications busses, e.g., by using existing communication protocols or by multiplexing over existing communication busses (e.g., an IPMI bus).

SUMMARY

Innovations and related subject matter disclosed herein overcome many problems in the prior art and address one or more of the aforementioned, as well as other, needs. This disclosure pertains generally to control systems, including, for example, detectors configured to issue an alert or a command to a controller in response to a detected change in state of a given system. For example, some disclosed detectors are configured to emit a simulated signal (e.g., an electrical signal) as a proxy for a state observed by a sensor, with a simulated fan-tachometer signal being but one example of a proxy signal.

Some disclosed detectors are configured to detect a leak of a working fluid from a heat-transfer system. Some disclosed leak detectors are configured to issue an alert or a command to a controller in response to a detected leak of a working fluid from a liquid-based heat transfer system.

Some disclosed detectors are configured to assess one or more aspects of a flow field, e.g., to assess a flow rate. Some disclosed detectors are configured to detect a flow rate of a working fluid through a portion of a heat-transfer system. Some disclosed flow-rate sensors are configured to emit a signal, or to issue an alert or a command to a controller in response to an observed or a detected change in state of a given system.

For example, some disclosed flow-rate sensors are configured to emit a signal, or to issue an alert or a command to a controller in response to an observed or a detected rate of flow (or an indicia of a rate of flow) of a working fluid through a liquid-based heat transfer system, as when an observed, detected, or indicated rate of flow exceeds a selected upper threshold flow rate or falls below a selected lower threshold flow rate. Some flow-rate sensors are configured to emit an output signal corresponding to an observed rate of flow (or an observed indicia thereof).

By way of example and not limitation, a flow-rate sensor can be configured to emit a simulated fan-tachometer signal (or other proxy signal) proportional to (or, more broadly, corresponding to) an indicia of flow rate observed by the sensor. A controller configured to receive such a simulated fan-tachometer signal can interpret the simulated fan-tachometer signal as corresponding to a predetermined measure of the indicia of flow rate (or measure of the flow rate). In response, the controller can issue a system command in correspondence to the indicia (or flow rate). As but one example, the system command can be a command to transmit an alert to a system administrator and/or a command to increase pump speed, as when the indicated flow rate might not suffice to cool an observed or an anticipated heat load, or to decrease pump speed, as when the indicated flow rate might provide more cooling than necessary based on an observed or an anticipated heat load and continued operation of the pump at a relatively higher speed emits more acoustic noise or consumes more energy than desired.

In some embodiments, an emitted signal, or an alert or command, includes a simulated fan-tachometer signal corresponding to a selected fan-rotational-speed as a proxy for an observed state different than a fan-rotational-speed (e.g., a flow rate or a detected leak). For example, an observed operational state can include an operational state of one or more system devices (e.g., a pump in a liquid-cooling system, a heat exchanger in a liquid cooling system, a frequency of an optical signal emitted by an optical emitter, an observed flow rate through one or more portions of a cooling system (e.g., through a segment of a conduit carrying a working fluid), etc.).

As but one possible and non-limiting example, a sensor can emit, in response to a detected one of a plurality of observable conditions, a simulated fan-tachometer signal corresponding to a respective fan-rotational speed as a proxy corresponding to the detected condition. For example, a leak detector can emit, in response to a detected leak, a simulated fan-tachometer signal corresponding to a fan-rotational-speed of 500 RPM (revolutions per minute). In turn, the fan rotational speed of 500 RPM can be interpreted by a controller as indicating, for example, that a leak has occurred (or at least has been detected) at a given system location.

As another example, a flow-rate sensor can emit, in response to a first observed flow rate (or an observed indicia of such a flow rate), a simulated fan-tachometer signal corresponding to a first fan-rotational-speed and a second fan rotational speed in response to an observed other flow rate (or indicia thereof). For example, the flow-rate sensor can emit a simulated fan-tachometer signal indicative of a selected fan speed proportional to the observed flow rate (or indicia thereof). A controller that receives such a proxy signal can, at least partially responsively to the proxy signal, issue a selected command (e.g., a system command to alter or to maintain a system operational state, a system shutdown command, an administrator alert command) responsive to a given interpretation of the proxy signal.

Some controllers are embodied in a computing environment.

As used herein, "working fluid" means a fluid used for or capable of absorbing heat from a region having a relatively higher temperature, carrying the absorbed heat (as by advection) from the region having a relatively higher temperature to a region having a relatively lower temperature, and rejecting at least a portion of the absorbed heat to the region having a relatively lower temperature. Although many formulations of working fluids are possible, common formulations include distilled water, ethylene glycol, propylene glycol, and mixtures thereof.

Some disclosed leak detectors include a sensor operatively coupled to a leak detector circuit. A leak detector circuit can be configured to deliver a signal having a selected waveform to a monitor circuit during normal operation of the cooling system and to terminate or otherwise interrupt the signal (as by modifying the waveform, for example) when a leak of liquid is detected, as by the sensor. Some disclosed leak detectors are configured to deliver a simulated tachometer signal to a monitor circuit or computing environment. The simulated tachometer signal can be similar to a tachometer signal emitted by a fan during normal operation of the fan until a leak is detected. Upon receiving a signal or other indication of a leak, the leak detector circuit can emit a different signal (or no signal) after a leak is detected. The different signal can be emitted continuously or only while a leak (or moisture or other proxy for a leak) is detected by the sensor.

For example, some disclosed leak detector circuits are configured to emit a simulated tachometer signal, e.g., a square wave having a duty cycle of about 50% (e.g., a duty cycle ranging from about 45% to about 55%), during normal operation, and to terminate or otherwise interrupt the simulated tachometer signal in response to a detected leak (or moisture or other proxy for a leak, such as a low operating pressure or a low-fluid level internal to the heat-transfer system). Such a leak detector circuit can be compatible with commercially available monitor circuits, firmware and/or software, particularly but not exclusively, monitor circuits, firmware and/or software configured to monitor a rotational speed of a fan using a tachometer signal emitted by the fan. Some monitors (e.g., circuits and/or computing environments) can be based on, by way of example, the Intelligent Platform Management Initiative (IPMI) specification, ver. 1.5/2.0 (described more fully below).

In some embodiments, a plurality of sensors or detectors can be operatively coupled to a given communication circuit, and a controller can configured to monitor the given communication circuit. Each respective sensor or detector in the plurality of sensors or detectors can be configured to emit any of a plurality of discrete, simulated signals as respective proxies for a plurality of selected, detectable operational states. For example, the sensors or detectors can emit discrete, simulated fan-tachometer signals corresponding to respective system operational states. Such multiplexing can allow existing communication channels to carry information regarding observed system operational states that differ substantially from the information historically carried by the existing communication channels.

By way of example and not limitation, a leak detector can be configured not to emit a simulated fan-tachometer signal in the absence of an observed leak, and to emit (e.g., over a selected communication circuit), responsively to a detected leak, a selected simulated fan-tachometer signal (e.g., a simulated fan-tachometer signal corresponding to a fan-rotational speed of 200 RPM). A controller configured to receive such a simulated fan-tachometer signal can interpret the simulated fan-tachometer signal as corresponding to a predetermined operational state. In response, the controller can issue a system command in correspondence with the operational state. As but one example, the system command can be a command to transmit an alert to a system administrator or a command to shut the system down.

As another example, a sensor can be configured to observe an operational state of a centrifugal pump. The sensor can be configured to emit a simulated fan-tachometer signal corresponding to a different fan-rotational speed (e.g., 400 RPM) in response to an observed pump failure (e.g., a pump rotational speed below a selected threshold rotational speed). A controller configured to receive the simulated fan-tachometer signal can issue a system command in response to and corresponding to the indication of a pump failure. The system command can include one or more of a command to transmit an alert to a system administrator, a command to increase a rotational speed of one or more other selected pumps, and a command to shut the system down.

Other particular but non-exclusive examples of multiplexed sensors include sensors configured to observe one or more of a rotational speed of the pump, a static pressure in a fluid within the pump, a temperature of a liquid in the pump, a temperature of a pump component, a flow rate through a conduit, and a number of hours during which a given pump has operated. Each sensor can be configured to emit a selected proxy signal corresponding to an observed operational state of the system.

Other innovative aspects of this disclosure will become readily apparent to those having ordinary skill in the art from a careful review of the following detailed description (and accompanying drawings), wherein various embodiments of disclosed innovations are shown and described by way of illustration. As will be realized, other and different embodiments of leak detectors and systems incorporating one or more of the disclosed innovations are possible and several disclosed details are capable of being modified in various respects, each without departing from the spirit and scope of the principles disclosed herein. For example, the detailed description set forth below in connection with the appended drawings is intended to describe various embodiments of the disclosed innovations and is not intended to represent the only contemplated embodiments of the innovations disclosed herein. Instead, the detailed description includes specific details for the purpose of providing a comprehensive understanding of the principles disclosed herein. Accordingly the drawings and detailed description are to be regarded as illustrative in nature and not as restrictive.

BRIEF DESCRIPTION OF THE DRAWINGS

Unless specified otherwise, the accompanying drawings illustrate aspects of the innovative subject matter described herein. Referring to the drawings, wherein like reference numerals indicate similar parts throughout the several views, several examples of systems incorporating aspects of the presently disclosed principles are illustrated by way of example, and not by way of limitation, wherein:

FIG. 3 shows a representative pin-out for a fan header operatively coupled to a pump;

FIG. 7 shows a pinout of a fan header operatively coupled to an embodiment of a leak detector disclosed herein;

FIG. 11 shows a schematic illustration of an optical flow-rate sensor;

FIG. 12 shows a schematic illustration of a retainer suitable for the optical flow-rate sensor shown in FIG. 11;

in FIG. 16A, a reflector is shown; in FIG. 16B, the rotational member has rotated to a position obscuring the reflector shown in FIG. 16A from view;

DETAILED DESCRIPTION

Figure 1:
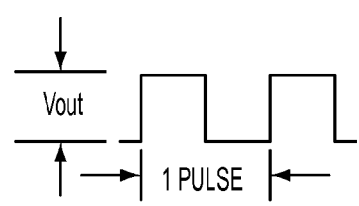
FIG. 1 shows a representative pulse of a square wave emitted by a Hall cell in response to a rotating fan rotor.

The following describes various innovative principles related to control systems by way of reference to specific examples of sensors for such systems. More particularly, but not exclusively, such innovative principles are described in relation to examples of leak detectors configured to detect a leak of a working fluid from a liquid-based heat transfer system (e.g., a liquid-based cooling system for cooling one or more electronic components that dissipate heat during operation), examples of flow-rate sensors configured to observe a flow rate through a liquid-based heat-transfer system, and related systems. Nonetheless, one or more of the disclosed principles can be incorporated in various other control system embodiments to achieve any of a variety of desired control system characteristics. Systems described in relation to particular configurations, applications, or uses, are merely examples of systems incorporating one or more of the innovative principles disclosed herein and are used to illustrate one or more innovative aspects of the disclosed principles.

Thus, control systems, sensors, leak detectors, flow-rate sensors, and associated circuits, computing environments, firmware and/or software having attributes that are different from those specific examples discussed herein can embody one or more of the innovative principles, and can be used in applications not described herein in detail, for example, to detect a leak of a fluid (e.g., a liquid, a gas, or a saturated mixture thereof) from, or to observe a local speed of a flow of such a fluid through, a heat-transfer system having any of a variety of flow configurations, such as a contained flow within a fluid conduit or a free-stream flow (e.g., a region of a fluid flow sufficiently spaced from a fluid boundary as not to be influenced by the boundary). Such systems can be configured to transfer heat to or from laser components, light-emitting diodes, chemical reactants undergoing a chemical reaction, photovoltaic cells, solar collectors, power electronic components, electronic components other than microprocessors, photonic integrated circuits, and other electronic modules, as well as a variety of other industrial, military and consumer systems now known or hereafter developed. Accordingly, embodiments of detectors and related control systems not described herein in detail also fall within the scope of this disclosure, as will be appreciated by those of ordinary skill in the art following a review of this disclosure.

Overview

A wide variety of control systems have been proposed and used. In a general sense, control systems estimate or observe an attribute of a given system under control of the control system. In response to the estimated or observed attribute, a control system can provide an output corresponding to the estimated or observed attribute in order to achieve a desired system response. Controls systems (or portions thereof) disclosed herein can be implemented in a computing environment. As indicated above and explained more fully below, some disclosed systems are configured to detect a leak of a working fluid from, for example, a liquid-based heat-transfer system. Some disclosed systems are configured to transmit an alert or other command in response to a detected leak.

Some disclosed sensors are configured to be backward compatible with existing control systems. For example, some existing control systems configured to monitor an operational status of a cooling fan for a computer system are configured to emit a signal corresponding to observed fan speeds, or to issue an alert or other command, when an observed fan speed drops below a selected threshold.

Taking advantage of an installed base of such existing control systems, some disclosed sensors have a circuit configured to emit a first simulated tachometer signal corresponding to a first observed condition (e.g., similar to a tachometer signal emitted by a normally operating fan) and to emit a different simulated tachometer signal corresponding to a second observed condition. In some instances, the different signal emitted in response to the second observed condition can be similar to a tachometer signal emitted by a failed or failing fan (e.g., a fan operating at an unacceptably low fan speed, or a fan having a locked rotor).

Another example of an operational status includes a flow rate through a conduit. Some disclosed sensors emit a simulated fan tachometer signal in correspondence with an observed volumetric (or mass) flow rate (or indicia thereof, such as, for example, a rotational speed of a rotational member within the flow of fluid).

An operational status can reflect a presence or absence of a detected leak. Some disclosed leak detectors have a circuit configured to emit a simulated tachometer signal similar to a tachometer signal emitted by a normally operating fan when no leak is detected and to emit a different signal (or no signal) in response to a detected leak. The different signal emitted in response to a detected leak can be similar to a tachometer signal emitted by a failed or failing fan (e.g., a fan operating at an unacceptably low fan speed, or a fan having a locked rotor).

Some disclosed systems incorporate a sensor configured to detect or observe an indicia of a change in state of a heat-transfer system. Some indicia pertain to a rate of flow of a working fluid, for example, through a portion of a liquid-based heat-transfer system. Other indicia pertain to a leak of such a working fluid. Some disclosed systems are configured to transmit an alert or other command in response to a threshold condition observed or detected by such a sensor.

As but one example, some disclosed flow-rate sensors are configured to observe (or to detect) a frequency at which a rotational member rotates about a selected axis of rotation in response to a passing flow of a working fluid. As will be described more fully below, such a rotational frequency can correspond to a speed (and thus a rate of flow) at which a flow of a selected fluid passes by or over the rotational member.

Control Systems

By way of introduction, computer systems commonly include one or more axial fans for cooling an electronic component. A rate of heat transfer from an electronic component or from a liquid-to-air heat exchanger (e.g., a radiator) to a stream of air passing over the component or the heat exchanger generally corresponds, in part, to a speed of the air stream. A speed of such an air stream generally corresponds to a rotational speed of the fan.

Taking advantage of such a correspondence between a fan's rotational speed (sometimes expressed in units of "revolutions per minute" or "RPM", and sometimes referred to as a "fan speed") and a rate of cooling afforded to an electronic component or a heat exchanger, some computer systems include a control system configured to adjust a fan speed in response to an observed temperature (e.g., a temperature of an electronic component). As an example, some control systems are configured to modulate a duty cycle of, for example, a square wave, and some fans, in turn, are configured to adjust their fan speed in correspondence with the modulated duty cycle.

Figure 2:
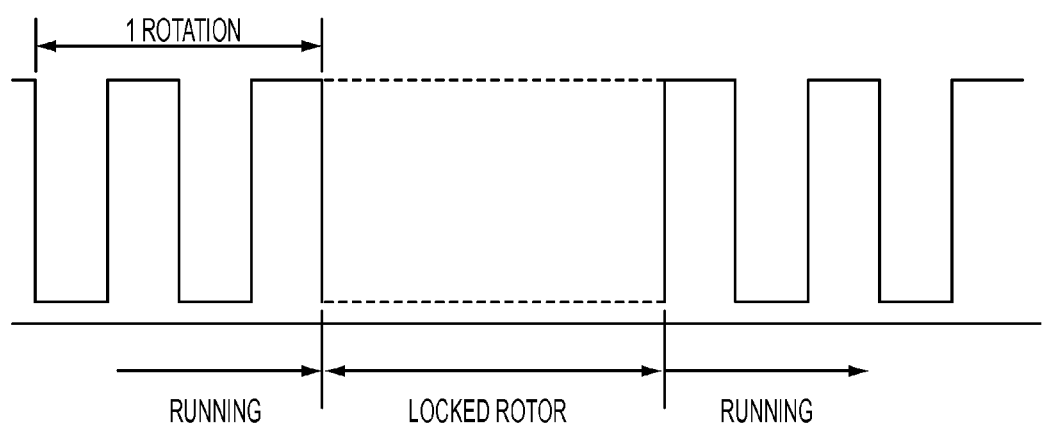
FIG. 2 shows a representative signal emitted by a fan in a running state, a locked rotor state, and another running state.

In addition (or alternatively), some computer systems include a control system configured to observe an output signal from a fan. Such an output signal can correspond to a rotational speed of the fan. For example, a fan can include a Hall cell configured to emit a square wave having a frequency corresponding to a rotational speed of a rotating magnetic field generated by a rotating fan rotor. Such an emitted square wave can have a duty cycle of about 50% when the rotor rotates at an approximately constant speed. Since the frequency of the square wave can correspond to the rotational speed of the fan, such a square wave is sometimes referred to as a "tachometer signal." FIG. 1 illustrates one pulse from a typical tachometer output having a square wave waveform. As another example, FIG. 2 shows a representative waveform of a tachometer output for a fan that changes from an operating state ("Running") having a 50% duty cycle, to a "Locked rotor" state in which no tachometer signal (or a steady-state signal) is emitted because the fan rotor does not rotate, and back to an operating state ("Running") having a 50% duty cycle.

In general, a control system can be configured to transmit an alert or other command in response to an observed signal exceeding a selected upper threshold or falling below a selected lower threshold. Some control systems are configured to resume monitoring the observed signal after transmitting the alert or other command. Other control systems (sometimes referred to in the art as a "latching system") are configured to continuously transmit an alert or other command.

Some existing control systems are configured to observe a tachometer signal emitted by a rotating fan and to emit a signal or otherwise initiate a system command (e.g., send an "alert", or initiate a system shut-down) in response to a selected change in state of a tachometer signal. A selected change of state of a tachometer signal can include a drop in frequency below a selected threshold (e.g., corresponding to an unacceptably low fan speed), a cessation of a tachometer signal or an emission of steady-state tachometer signal, as when a fan rotor stops rotating. In relation to FIG. 2, such a control system can be configured to emit a signal or otherwise initiate a system command if an observed signal indicates that a fan is in a "locked rotor" state.

Some suitable control systems configured to monitor fan speed are based on the Intelligent Platform Management Initiative (IPMI) specification, ver. 1.5/2.0. Generally, IPMI is a message-based, hardware-level interface specification.

An IPMI subsystem can operate independently of an operating system of a computer incorporating the IPMI subsystem, allowing a system administrator to manage the computer independently of the operating system (e.g., before the operating system boots, or when the computer is powered down). A Baseboard Management Controller (BMC) can include a specialized microcontroller configured to manage an interface between the system management software and computer system hardware.

Among many features, an IPMI subsystem can monitor a status of various operating parameters, including, for example, system temperatures, fan speeds, chassis intrusion, etc. In some instances, an IPMI subsystem can be configured to monitor a tachometer signal emitted by one or more fans and, when the tachometer signal indicates a fan speed below a selected threshold, the subsystem can emit an alert or other command.

Computer systems incorporating such control systems for fans commonly include a plurality of electrical connectors, with each being configured to operatively couple a fan to a corresponding plurality of circuits configured, respectively, to power, control and monitor the fan. For example, such an electrical connector can have four electrical couplers corresponding respectively to (A) a power supply circuit configured to convey an electrical current for powering the fan motor; (B) an electrical ground; (C) a pulse-width modulation circuit configured to convey a pulse-width modulation signal (sometimes referred to as a "PWM signal") for controlling the fan; and (D) a sense circuit configured to convey a tachometer signal corresponding to a fan speed (sometimes referred to in the art more generally as a frequency generator signal, or an "FG" signal). Such an electrical connector is sometimes referred to in the art as a "header" or a "fan header". FIG. 3 shows a typical pinout for a header with annotations reflecting use of the header in conjunction with a pump.

Leak Detectors

A leak detector circuit can be configured to respond to a leak (e.g., moisture or another selected proxy for a leak) of a working fluid detected by a sensor. For example, an innovative leak detector circuit can be configured to emit a first waveform in the absence of a detected leak and to emit a second waveform responsive to a detected leak. Any suitable sensor configured to detect a leak (or other proxy for a leak, e.g., moisture, presence of a working fluid at a position external to a heat-transfer system, a low pressure in the heat-transfer system, a low fluid level in the heat-transfer system) can be used in connection with such an electrical circuit.

Figure 4:
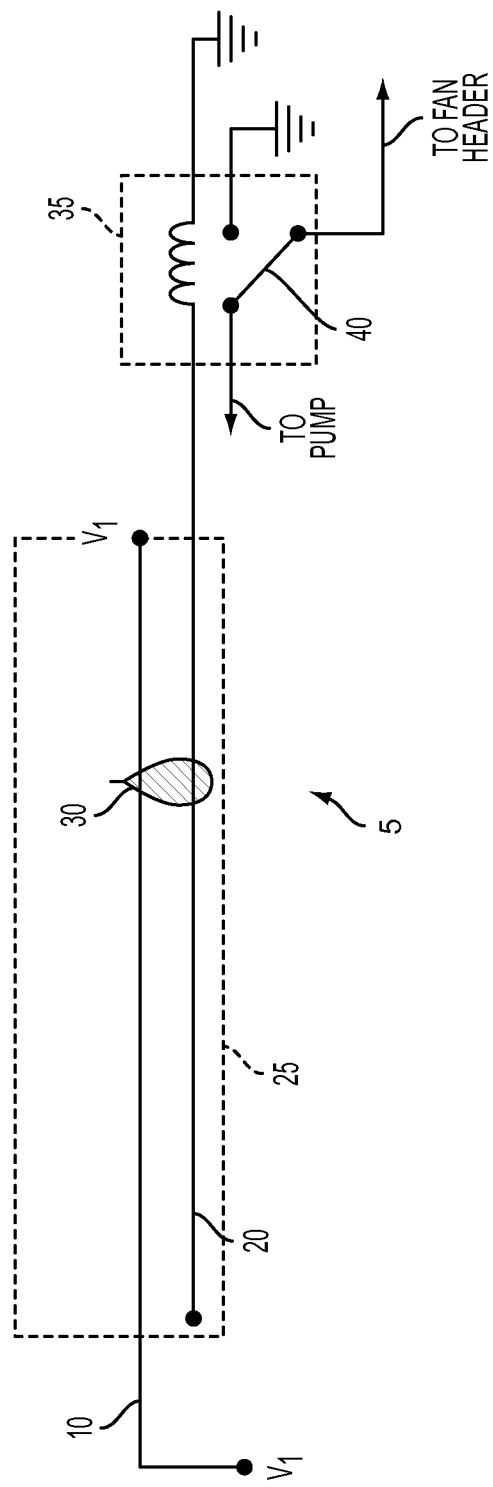
FIG. 4 shows a portion of but one of many leak detector embodiments disclosed herein.

As but one of many possible examples of leak-detection sensors, a leak-detection sensor 5 can have a first leak-detection wire 10 and a second leak-detection wire 20, as shown in FIG. 4. The first and the second leak-detection wires 10, 20 can comprise respective exposed traces on a printed circuit board. As shown in FIG. 4, the first leak-detection wire 10 can extend from a power plane, $V_1$. The second leak-detection wire 20 can extend generally parallel to and spaced apart from the first leak-detection wire 10. A region in which the first and the second wires 10, 20 are coextensive can define a leak-sensitive region 25 of the sensor.

A leak can be detected when an open circuit between the first and the second leak-detection wires 10, 20 is closed. For example, a drop 30 of a leaked liquid can span a gap between the first and the second leak-detection wires 10, 20 within the leak-sensitive region 25 of the sensor 5, electrically coupling the first and the second leak-detection wires to each other.

When the circuit between such first and second leak-detection wires 10, 20 is closed, the circuit of the leak detector 5 can emit a corresponding signal indicative of a detected leak. For example, when the first and the second leak-detection wires 10, 20 shown in FIG. 4 are electrically coupled to each other, the second leak-detection wire 20 can be pulled high (e.g., can have a voltage potential corresponding to the voltage of the power plane, $V_1$), and can activate a relay 35. When the illustrated relay 35 is activated, the latch 40 electrically coupling the pump and the fan header to each other can be switched to open (e.g., disconnect) the coupling between the pump and the fan header. Such a disconnection of at least one coupling between the pump and the header can serve as a signal to a monitoring system that a leak has been detected. The monitoring system can in response initiate an alert or a system command.

Figure 5:
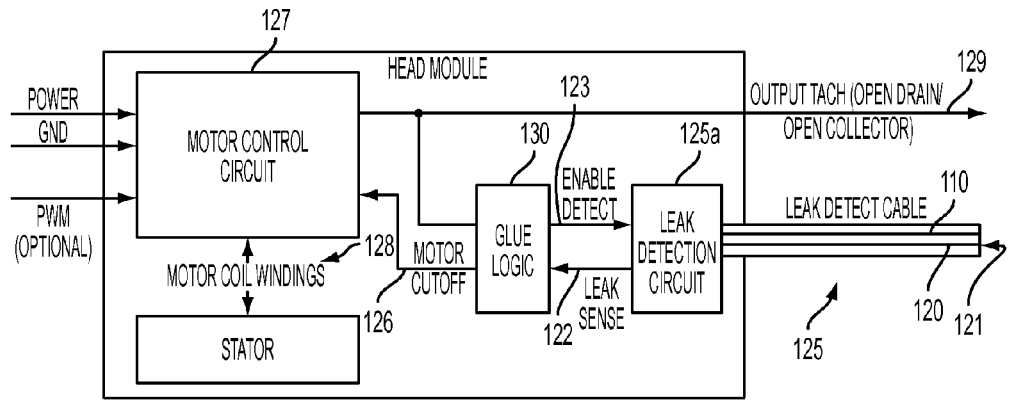
FIG. 5 shows a block diagram of a leak detector and a portion of an associated control system in relation to a fluid heat exchange system.

In FIG. 5, a leak detection sensor is schematically illustrated as extending from an integrated pump and heat exchanger assembly (sometimes referred to in the art as a "Head Module"). U.S. patent application Ser. No. 12/189,476 and related patent applications describe examples of such Head Modules. The leak detection sensor 125, 125a shown in FIG. 5 has first and second leak-detection wires 110, 120 (referred to in FIG. 6 as "Cable Conductor 1" and "Cable Conductor 2", respectively) spaced apart from each other to form a gap 121. Such a leak detection sensor is sometimes referred to in the art as a "Leak Detect Cable." One or both of the leak-detection wires 110, 120 can be partially or fully embedded (or otherwise surrounded by) a semi-conducting carrier. The first and/or the second leak-detection wires 110, 120 can be formed from an alloy of copper.

Figure 6:
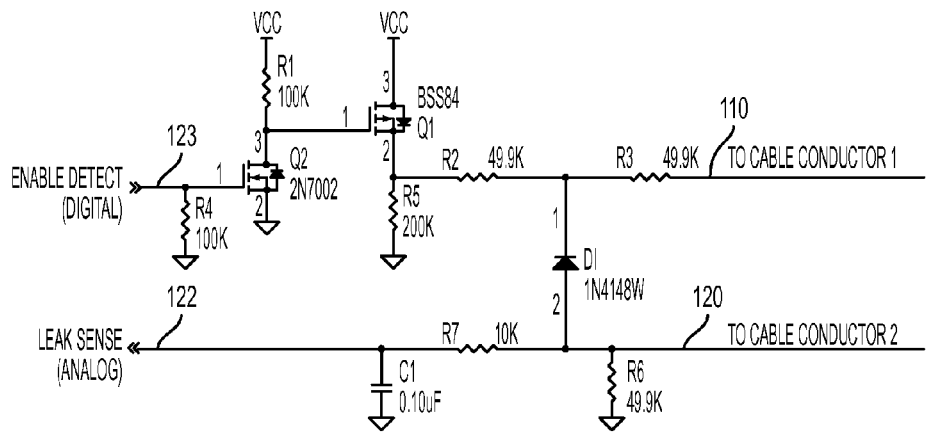
FIG. 6 shows a schematic illustration of an embodiment of a circuit configured according to the block diagram shown in FIG. 5.

A conductive fluid spanning the gap between the first and second leak-detection wires 110, 120 can provide a "non-trivial" resistance between the first and the second leak-detection wires. As used herein, a "non-trivial resistance" means a finite resistance sufficient to electrically couple the first and the second leak-detection wires to each other. With a circuit configured as shown in FIG. 6, a non-trivial resistance between the first and the second leak-detection wires can supply the analog Leak Sense line 122 with a non-zero voltage.

As indicated in FIG. 5, some leak detectors have a functional module 130 (sometimes referred to in the art as a "Glue Module") configured to respond to a leak detected by a leak detection sensor 125. The Glue Module shown in FIG. 5 can be configured to deliver a logic high signal to the FG line (labeled as "Output Tach" in FIG. 5) responsive to a signal indicative of a leak received over the Leak Sense line 122.

In some embodiments, the Glue Logic module is configured to monitor the Leak Sense line 122 continuously. In other embodiments, the Glue Logic module is configured to sample the Leak Sense line 122 at defined times (e.g., at selected intervals, or at selected intermittent times). The Glue Logic can also be configured to transmit a signal over an Enable Detect line 123, and, as shown by way of example in FIG. 6, the Leak Detection Circuit 125a can be configured to become operative in response to a signal received over the Enable Detect line 123.

A Glue Logic module can be configured to interrupt operation of a pump motor responsive to a signal received over the Leak Sense line 122 indicative of the existence of a leak (e.g., an electrical coupling between the first and the second leak-detection wires). For example, a Motor Cutoff line 126 can carry a signal emitted by the Glue Logic, and a Motor Control Circuit 127 can respond to a signal received over the Motor Cutoff line 126 by interrupting power to the motor 128. Alternatively (or additionally), the Glue Logic can force an output tachometer signal 129 (e.g., an FG signal) from the Head Module to a logic 0 (e.g., low logic) to signify to a monitoring system that there has been a failure associated with the Head Module.

Many other leak-detection sensor and leak detector circuit configurations are possible. As but several examples, such sensors can include a capacitive moisture sensor, an optical sensor, an infrared sensor, a pressure sensor configured to observe a pressure within the heat-transfer system, a sensor configured to detect a low fluid level in the heat-transfer system, and other sensors now known and hereafter developed.

Some leak detectors can have an electrical circuit operatively coupled to an FG signal pin of a header and be configured, in the absence of a detected leak, to emit a simulated tachometer signal 129 having a waveform similar to a waveform emitted by a properly operating fan. FIG. 7 shows a header operatively coupled to such an electrical circuit. The electrical circuit (not shown) can be further configured to emit a simulated tachometer signal 129 having a waveform similar to a failed or failing fan in response to a detected leak of a liquid from a liquid-base heat-transfer system (e.g., when a circuit between first and second leak-detection wires is closed). Alternatively, the electrical circuit can be configured to emit no tachometer signal, similar to a fan having a locked rotor (see FIG. 2) in response to a detected leak of a liquid from a liquid-based heat-transfer system.

As an example, a leak detector circuit 225 can be operatively coupled to an available fan header. In response to a detected leak, the simulated signal can be interpreted as by switching a relay as described above in relation to FIG. 4.

Alternatively, a leak-detection sensor 225 can be operatively coupled to an electrical circuit associated with one or more pumps 210 of a liquid-based heat-transfer system. For example, such a pump 210 can be electrically coupled to a header 231 having a power pin, a ground pin, a PWM pin and an FG pin. The power pin can be operatively coupled to the pump motor to convey an electrical current to the pump to operate the pump. The PWM pin be operatively coupled to a pump controller and convey a pump-control signal to the pump controller, e.g., to control a speed of the pump. The FG pin can convey monitor a tachometer signal emitted by the pump to a sensing circuit configured to monitor the pump (or fan) speed.

In one example (e.g., shown in FIG. 8), a leak detector circuit 225 can be operatively coupled between the power pin of the header 231 and the pump motor 210. In such an embodiment, the leak detector circuit 225 can interrupt a supply of electrical current to the pump (or increase a supply of electrical current to the pump) in response to a detected leak, causing a corresponding reduction (or increase) in pump speed. A corresponding FG signal emitted by the pump can reflect the diminished (or increased) pump speed. A system configured to monitor the FG signal emitted by the pump can, in response to a reflected change in pump speed, transmit an alert signal (e.g., to a system administrator), a system command (e.g., a command to increase a pump speed of another pump in an attempt to compensate for a diminished performance of a stalled pump, a system-shut-down command, etc.), or both. Some implementers might elect not to interrupt power to a pump if stopping a pump might be considered a catastrophic failure.

In an alternative embodiment, a leak detector circuit 225 can be operatively coupled between the PWM pin of the fan header 231 and the pump 210. In such an embodiment, the leak detector circuit 225 can interrupt a PWM signal conveyed to the pump 210 by the PWM pin of the fan header and convey an alternative PWM signal (or no PWM signal) to the pump in response to a detected leak. The alternative PWM signal can cause the pump to speed up, to slow down, or to stop. An FG signal emitted by the pump can reflect the change in pump speed. A system configured to monitor the FG signal emitted by the pump can, in response to a reflected change in pump speed, transmit an alert signal (e.g., to a system administrator), a system command (e.g., a command to increase a pump speed of another pump in an attempt to compensate for a diminished performance of a stalled pump, a system-shut-down command, etc.), or both.

In still another alternative embodiment, a leak detector circuit 225 can be operatively coupled between the FG pin of the fan header 231 and the pump 210. In such an embodiment, the leak detector circuit 225 can interrupt an FG signal emitted by the pump and convey an alternative FG signal (or no FG signal) to the FG signal pin in response to a detected leak. The alternative FG signal can simulate a diminished pump speed, a selected increased pump speed, or no pump speed. A system configured to monitor the simulated FG signal can, in response to a selected change in the simulated FG signal corresponding to a change in pump speed, transmit an alert signal (e.g., to a system administrator), a system command (e.g., a command to increase a pump speed of another pump in an attempt to compensate for a diminished performance of a stalled pump, a system-shut-down command, etc.), or both.

Figure 8:
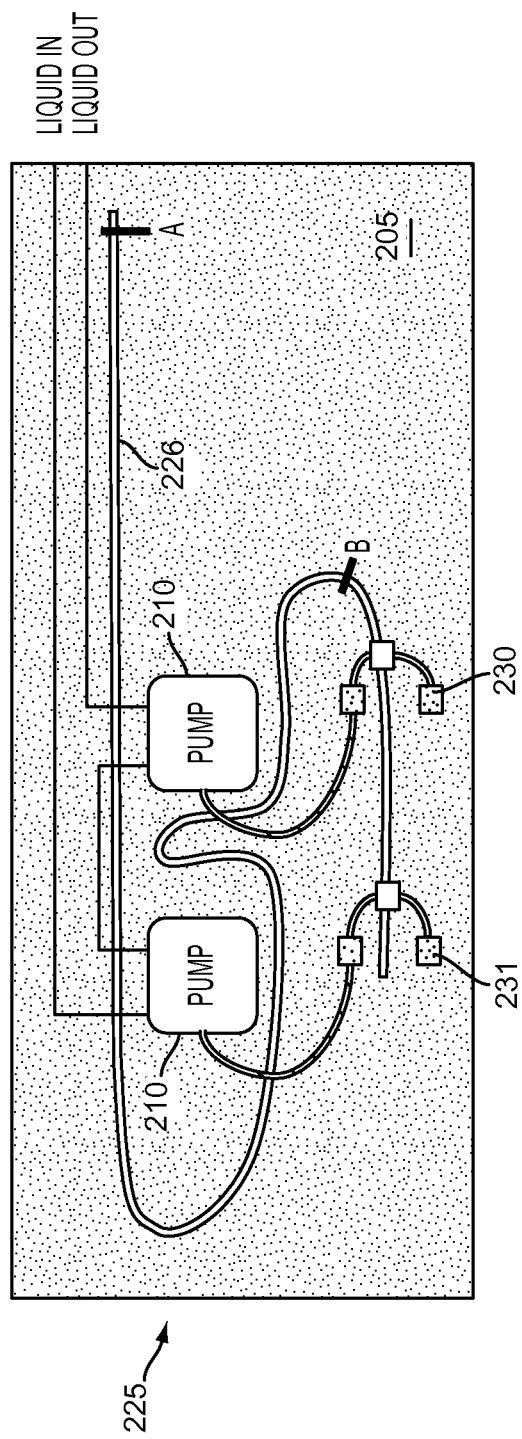
FIG. 8 shows a schematic illustration of a system including a leak detector disclosed herein.
Figure 9:
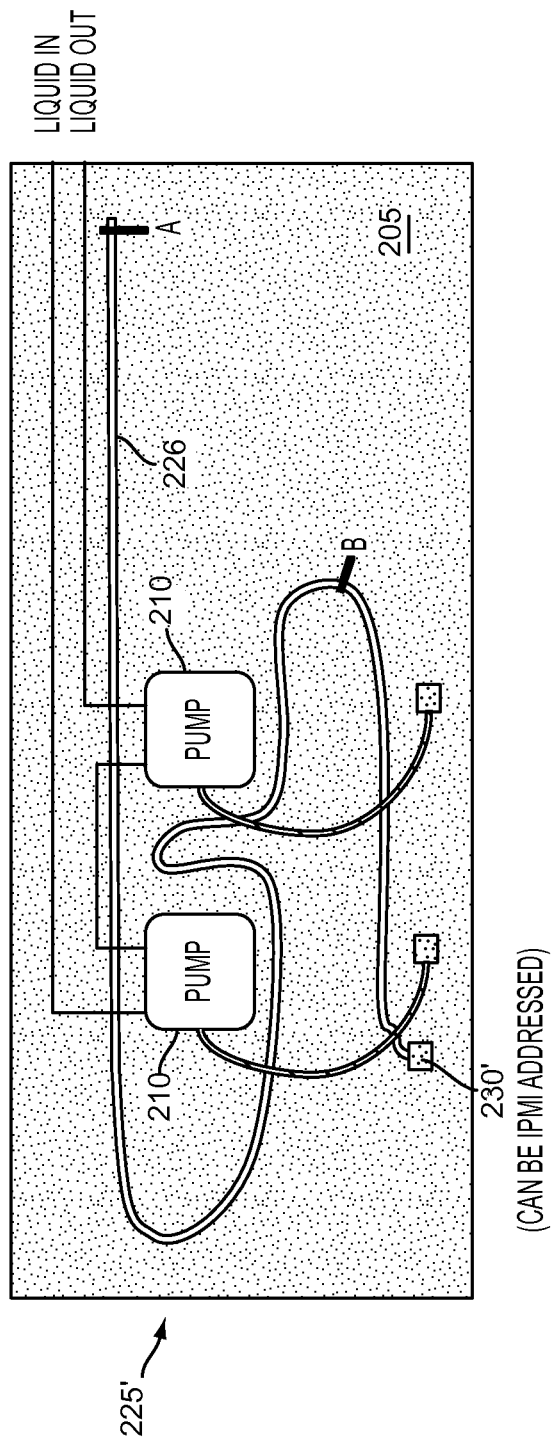
FIG. 9 shows a schematic illustration of an alternative system including a leak detector disclosed herein.

A leak sensor 225 can be positioned adjacent to (e.g., routed around) a pump 210 or other component of a liquid-based heat-transfer system, as indicated by way of example in FIGS. 8 and 9. For example, a sensor 225 can be positioned on, embedded in, affixed to, positioned adjacent to, or otherwise operatively coupled to a printed circuit board 205 such that the sensor defines a sensor region 226. The sensor region can be selected to correspond to a region that might be susceptible to wetting by a working fluid in the event of a leak.

FIGS. 8 and 9 show examples of a sensitive region defined by a leak sensor 225. The illustrated sensitive region 226 extends along the leak sensor (e.g., between points "A" and "B") routed on a surface of a printed circuit board 205. With circuits configured as shown in FIG. 8, the leak detector can be configured to interrupt a tachometer signal emitted by each pump 210 in response to a detected leak. Alternatively, each of the illustrated pumps 210 and the leak detector circuit 225 can be configured to emit one or more simulated fan-tachometer signals corresponding to one or more respective observed operational states. The one or more simulated fan-tachometer signals can be transmitted over the illustrated fan headers 231, for example, to an IPMI bus. A controller can receive and interpret the one or more signals as a proxy for the observed operational state, and responsively issue one or more corresponding system commands.

In FIG. 9, the leak detector circuit 225' is configured to interrupt a simulated tachometer signal in response to a detected leak. Such interruptions can simulate a tachometer signal emitted by a fan having a "locked rotor." A corresponding control system configured to monitor a tachometer signal emitted from a fan can respond to a simulated "locked rotor" signal by initiating an alert or other system command.

Overview of Flow Sensors

Figure 10:
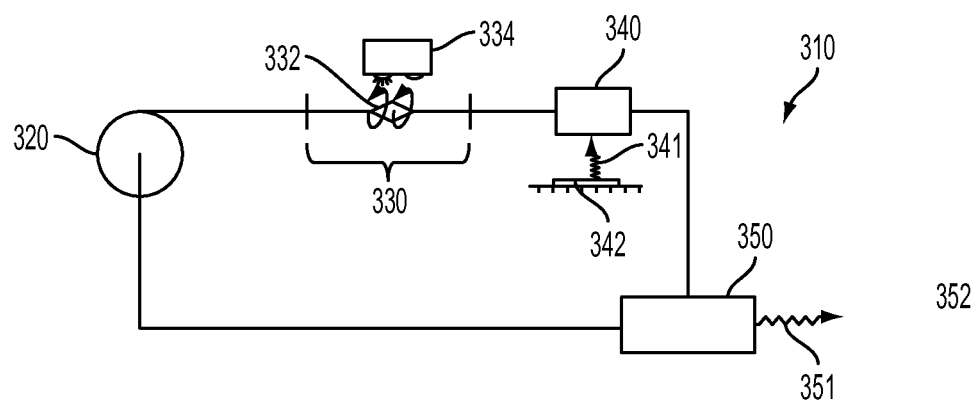
FIG. 10 shows a schematic illustration of a cooling system having an optical flow-rate sensor of the type disclosed herein.

FIG. 10 illustrates a fluid circuit 310 having a pump 320, an optical flow-rate sensor 330, a heat exchanger 340 configured to transfer heat 341 from a heat dissipating component (e.g., a microprocessor), and a radiator 350 configured to dissipate heat 351 from the working fluid to an environment 352. In some fluid circuits, the pump 320 and the heat exchanger 340 are combined into an operative subassembly, as described by way of example in U.S. patent application Ser. No. 12/189,476, among other patent applications.

A flow-rate sensor 330 can include a rotational member 332 positioned within a segment of conduit 331 and a tachometer 334 configured to detect a rotational speed of the rotational member. As shown schematically in FIG. 11, the rotational member 332 can be configured to receive momentum from a flow of a working fluid passing over the rotational member, in a manner similar as a turbine of a windmill receiving momentum from a flow of air passing over the turbine. A rotational member 332 of the type disclosed herein can include a generally axisymmetric arrangement of wings, foils, blades, faces, or screws positioned within a conduit suitable for conveying a flow of a working fluid such that a flow of a selected fluid passing over the arrangement of wings, foils, blades, faces, or screws applies a torsional force to the rotational member to urge the rotational member in rotation about the axis of rotation.

Figure 13:
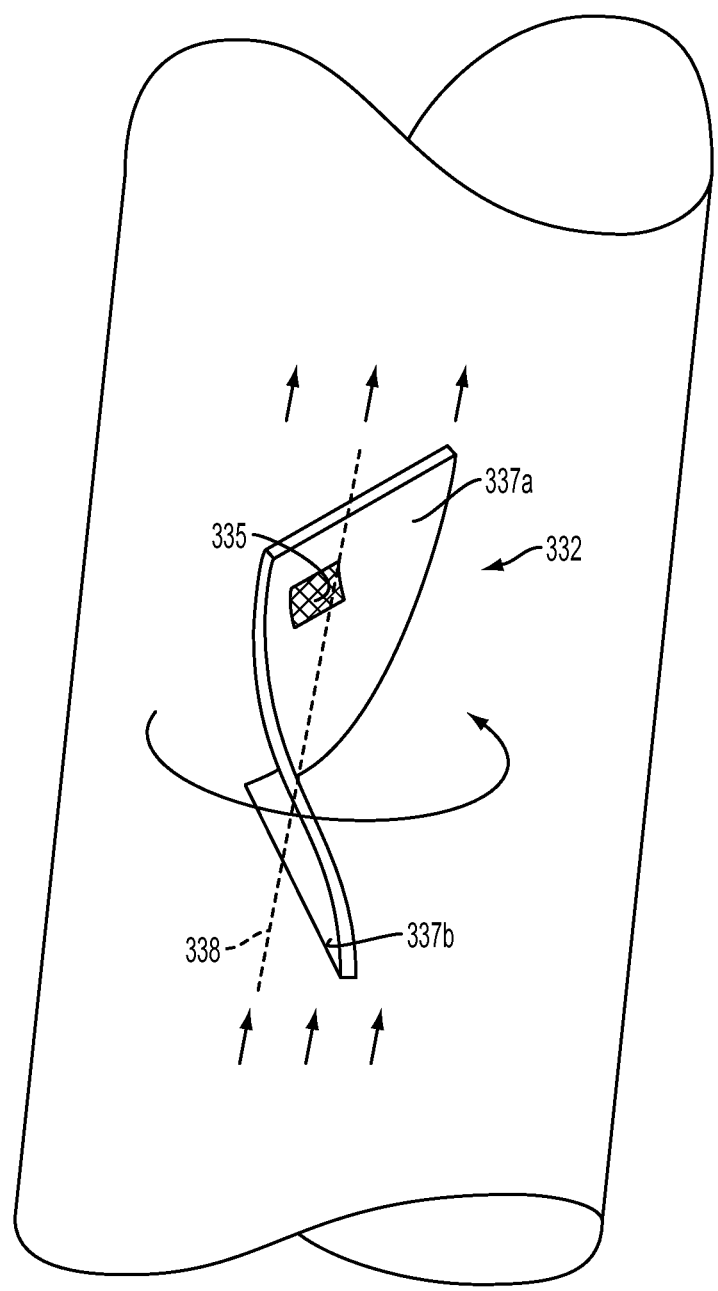
FIG. 13 shows one possible configuration of a rotational member as disclosed herein.

Some body portions comprise a thin shell member having opposed first and second sides 337a, 337b. As shown in FIG. 13, a thin shell member can define a primary axis 338 extending longitudinally of the shell member and a secondary axis 338a extending transversely relative to the primary axis. The thin shell member can be twisted about the primary axis 338 so as to define a foil-shaped member configured to convert momentum from a passing fluid to a torsional force applied to the thin shell member. FIG. 13 shows but one possible example of such a foil-shaped member.

A torsional force applied to the rotational member (e.g., member 332) can correspond to a rate of flow of a working fluid past the rotational member, with higher flow rates corresponding to relatively higher torsional forces. For example, a lift force on a wing in a stream of an incompressible fluid can increase in proportion to the square of the speed of the approaching fluid. A lift force applied to the rotational member 332 at a position spaced apart from a central, longitudinal axis 338 applies a turning moment (e.g., a torque, or a torsional force) to the rotational member about the axis 338. The turning moment can urge the rotational member 32 in rotation. In some axisymmetric embodiments of rotational members 332, the turning moment can urge the rotational member 332 in rotation about the central, longitudinal axis 338. The turning moment can correspond to the lift force (torsional force) generated by the flow of the working fluid past the rotational member. Moreover, the speed of rotation of the rotational member 332 can correspond to the torsional force applied to the rotational member. Accordingly, the rotational speed of the rotational member can correspond to the speed of an approaching flow of the fluid. And, a volumetric flow rate (or a mass flow rate) of the fluid through a closed conduit corresponds to the speed of the fluid through the conduit.

Thus, a rotational speed of the rotational member 332 positioned within a fluid conduit can correspond to a volumetric flow rate (or mass flow rate) of a fluid through the conduit 331. Although determining an algebraic expression for a relationship between rotational speed of a given rotational member in a flow of a selected fluid might be possible, such a relationship or correlation can be determined experimentally for each combination of rotational member configuration, conduit configuration, and working fluid.

Figure 14:
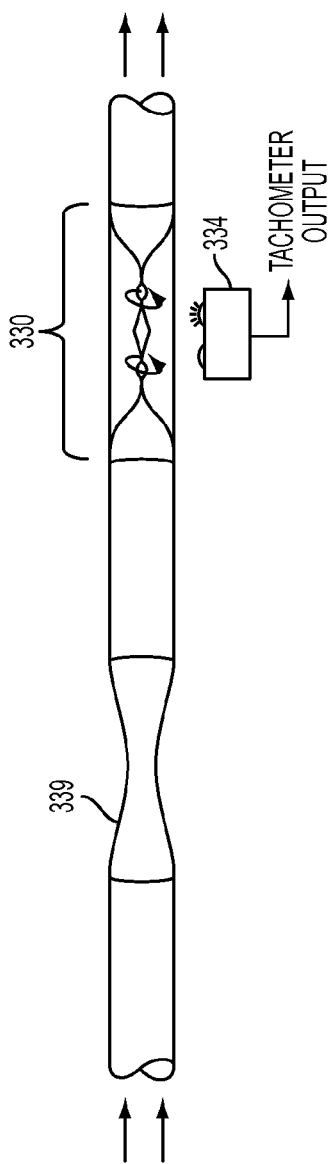
FIG. 14 shows a schematic illustration of an apparatus configured to calibrate a flow-rate sensor of the type shown in FIG. 13.
Figure 15:
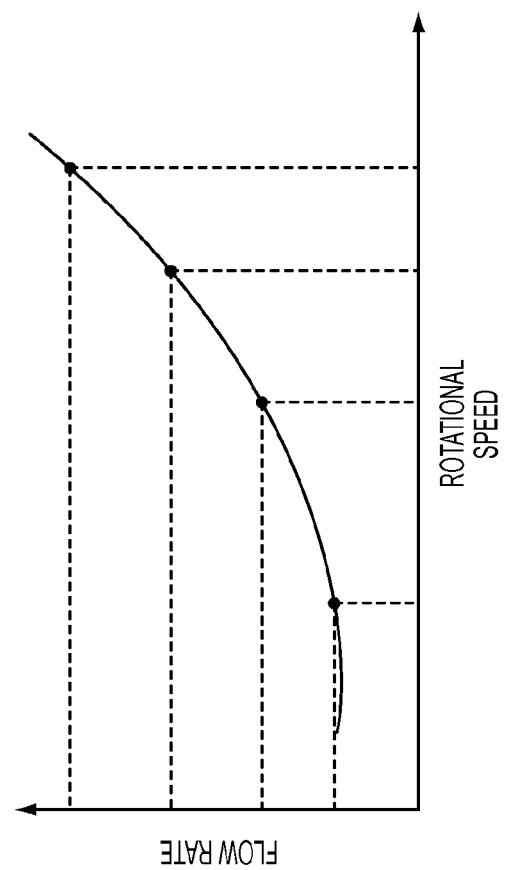
FIG. 15 shows a plot of a calibration of a flow-rate sensor.

Though not to scale, the plot in FIG. 15 generally illustrates one example of a correlation between an observed rotational speed of the rotational member 332 and a (volumetric or mass) flow-rate past the rotational member. An apparatus of the type shown in FIG. 14 can be used to assess such a correlation and to generate such a plot.

For example, a conventional flow-rate sensor (e.g., a Venturi-type sensor) can be used to determine each of several selected (mass or volumetric) flow rates of a working fluid, and the tachometer can emit a signal indicative of the rotational speed of the rotational member at each respective flow rate. Each flow-rate/rotational speed pair of readings can be plotted as indicated by the plot shown in FIG. 15, to reveal an experimentally determined correlation between rotational speed of the rotational member 332 and fluid flow rate through the conduit, for a particular combination of rotational member configuration, conduit configuration, and working fluid. In general, a unique correlation between rotational speed of the rotational member and flow rate of working fluid exists for each combination of working fluid, rotational member configuration, and conduit configuration. However, once a correlation between (volumetric or mass) flow rate and rotational speed is determined for a selected combination of conduit configuration, rotational member configuration, and working fluid, the rotational speed of the rotational member can be observed, and, based on the correlation of flow-rate through the conduit segment 332 and rotational speed of the rotational member, the corresponding flow rate (e.g., volumetric or mass flow rate) can be determined.

The tachometer can include any of a variety of known and hereafter developed sensor arrangements suitable to detect a rotational speed of the rotational member 331. As but one example, a suitable tachometer can include an optical sensor having an emitter, a detector, and a counter.

For example, the rotational member 332 can be positioned in a conduit 331 having a transparent outer wall 331a, or other suitable port configured to permit a selected frequency range (or band) of electromagnetic radiation (e.g., radiofrequency, X-rays, or light in the infrared, visible, or ultraviolet spectra) to pass therethrough. Although many suitable emitter and detector configurations are possible, the following discussion will refer to the emitter as a light emitter and the detector as a light detector by way of example, and not limitation, for ease of description.

In some embodiments of flow sensors, a light emitter 333 can emit light (e.g., for a duration substantially longer than a period of rotation for the rotational member 332) in a direction toward the rotational member 332, and one or more portions 335 of the rotational member can reflect incident light (or other radiation band) from the emitter 333 toward the light detector 336. The counter 337 can increment a count each time the light detector 336 detects light reflected by the reflective portion 335 of the rotational member 332. Such detection can be responsive to a detected presence of light compared to a detected absence of light, or to a detected absence of light compared to a detected presence of light. With such an arrangement, a rate at which the count increases (e.g., a time-rate-of-change of the count) can correspond to a rate at which the light detector 336 detects a reflection of light from the rotational member 332. In turn, the rate at which the light detector 336 detects a reflection of light from the rotational member 332 can correspond to a rotational speed (i.e., a frequency of rotation, or an angular speed) of the rotational member 332, and thus, as noted above, a rate of flow of a working fluid through a selected conduit.

Figure 16A:
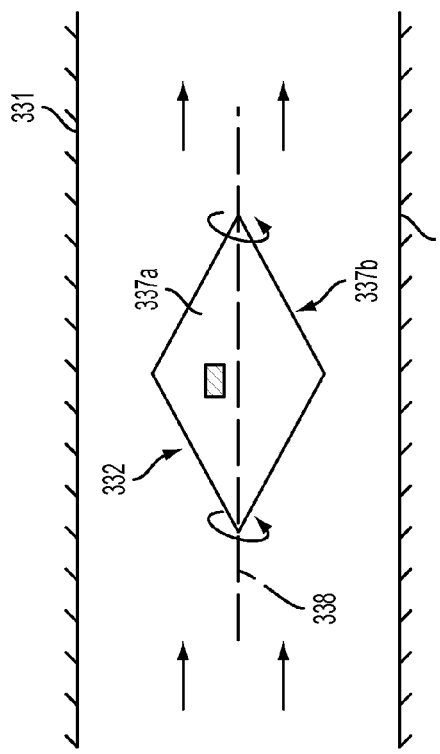
FIGS. 16A and 16B show respective schematic illustrations of a rotational member of the type shown in FIG. 13.
Figure 16B:
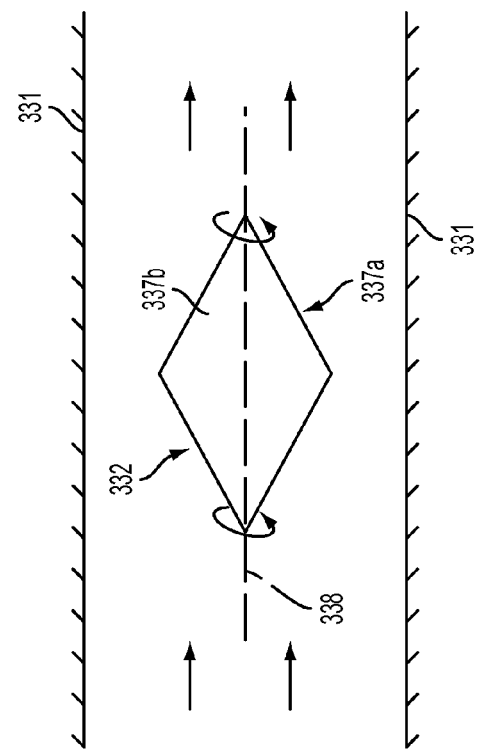

For example, the rotational member 332 can be configured to reflect incident light toward the detector 336 once per revolution of the rotational member about the axis of rotation, as with the member 332 shown in FIGS. 13, 16A and 16B. As but one example, the rotational member 332 can have a relatively less reflective body portion 337a, 337b that rotates about an axis of rotation 338 and a relatively more reflective reflector portion 335 affixed to or on, or integral with, the relatively less reflective body portion 337a, 337b. The reflector portion 335 can be so arranged as to reflect light toward the detector 336 once during each revolution of the body portion 332.

The reflector portion 335 can comprise a reflector member positioned on one of the opposed sides 337a, 337b of the thin shell member shown in FIGS. 13, 16A and 16B. With such an arrangement, a rate (or a frequency) at which the count increments in response to detected reflections from the reflector portion 335 can approximate the angular speed of the rotational member, which in turn can correspond to a rate of flow of a working fluid through the conduit 331.

As another example, the rotational member 332 can be configured to reflect incident light toward the detector 336 twice per revolution of the rotational member about the axis of rotation. For example, the rotational member 332 can comprise opposed first and second reflective portions (not shown) so arranged relative to the opposed faces 337a, 337b that each of the first and the second reflective portions reflects light toward the detector 36 once during each revolution of the rotational member (i.e., such that light is reflected toward the detector 36 twice per revolution of the rotational member). With such an arrangement, one-half of a rate (or a frequency) at which the count increments in response to detected reflections from the first and the second reflector portions can approximate the angular speed of the rotational member, which in turn can correspond to a rate of flow through the conduit.

In general, the rotational member 332 can be configured to reflect incident light toward the detector N times per revolution of the rotational member about the axis of rotation. With such an arrangement, 1/N of a rate (or a frequency) at which the count increments in response to detected reflections from the rotational member can approximate the angular speed of the rotational member, which in turn can correspond to a rate of flow through the conduit.

FIG. 12 shows a particular exemplary embodiment of a flow-rate sensor 330 of the type described above. The illustrated sensor 330 has a transparent (in relation to a selected spectrum of incident electromagnetic radiation) segment 336 of conduit with a rotational member 332 positioned therein. A tachometer 334 is positioned externally of the conduit and is arranged to emit light (or other band of radiation) through the transparent segment 36 and toward the rotational member 332. The tachometer 334 is further arranged to detect light (or other radiation) reflected by the rotational member 332 through the transparent segment 336.

The illustrated sensor 330 also has a retainer 360 configured to suspend the rotational member 332 within the conduit 31 in spaced relation from an interior wall 331b of the transparent segment of conduit. Such a suspended arrangement can permit the rotational member 332 to rotate about a selected axis of rotation 338 within the conduit 331 and without being carried away by a flow of a working fluid passing through the conduit.

The retainer 360 can include an upstream retainer member 361 and a downstream retainer member 362. One or both of the retainer members 361, 362 can be configured to urge outwardly against an inner wall 331b of the segment 331a of conduit. In some embodiments, one or both retainer members 361, 362 comprise an elongate member that resiliently urges against the wall 331b, as shown in FIG. 12.

In some embodiments, one or both retainer members 361, 362 include a segment 363 configured to matingly engage with a correspondingly configured region of the inner wall 331b of the conduit 331a. As FIG. 12 shows, the segment 363 configured to matingly engage with the inner wall 331b can include a bent segment 364 of wire configured to rest within a corresponding détente 365, or other recessed region of the inner wall 331b.

The rotational member 332 can be rotatably coupled to the retainer 360. For example, a first swivel member 366a can rotatably couple the rotational member 35 to an upstream retainer member 361 and a second swivel member 366b can rotatably couple the rotational member 335 to a downstream retainer member 362, as shown in FIG. 11.

The conduit 331a having a rotational member 32 positioned therein can be fluidly coupled in series (or "in-line") with one or more other components of a fluid circuit 310. Such a placement of the conduit 331a can facilitate measurement of a rate of flow of a working fluid through the one or more components, once a correlation (e.g., FIG. 15) between observed rotational speed of the rotational member 332 and a volumetric (or mass) flow rate of the working fluid through the conduit 331a has been determined.

A flow sensor 330 of the type described herein can be incorporated in a cooling system, such as, for example, a cooling system configured to cool an electronic component or other device that dissipates waste heat during operation. As noted above, a tachometer output of such a flow sensor can indicate a rate of fluid flow through the sensor.

In some embodiments, the output of the tachometer 334 can be multiplexed so as to be compatible with a known or installed communication bus, e.g., over an IPMI bus. As noted above, a computer system incorporating a cooling system can include a controller configured to transmit an alert or other command in response to an observed signal exceeding a selected upper threshold or falling below a selected lower threshold. The observed signal can be emitted by a flow sensor. In some instances, the emitted signal can be emitted by a tachometer 334 configured to observe a rotational speed of a rotational member 332, and the control system can transmit an alert or other command in response to an observed tachometer signal exceeding a selected upper threshold or falling below a selected lower threshold. The upper or lower threshold can correspond to an upper or a lower fluid flow-rate threshold.

Figure 17:
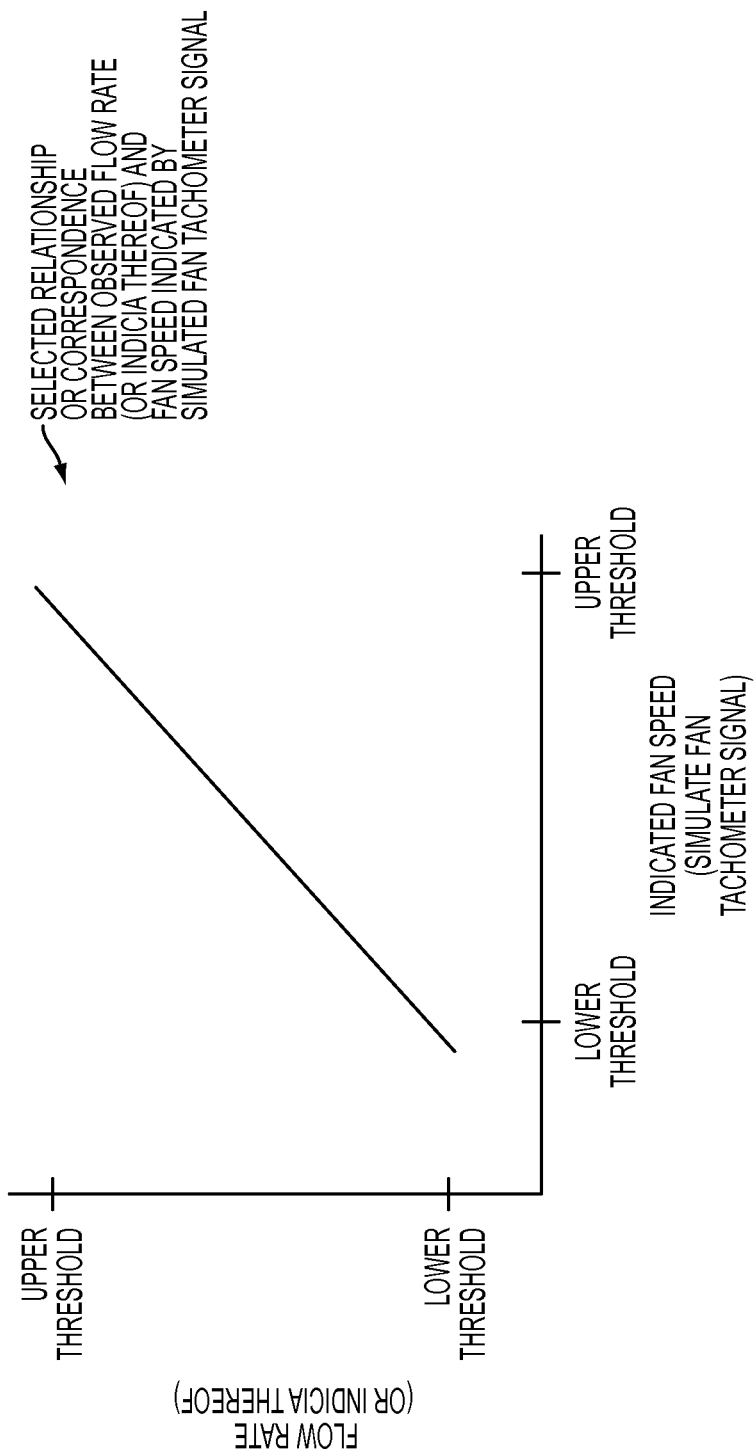
FIG. 17 shows a selected proxy relationship (or correlation) between an observed flow rate of a working fluid (or indicia thereof) and a fan speed indicated by a simulated fan-tachometer signal.

As well, or alternatively, a flow-rate sensor, e.g., an optical flow-rate sensor 330 of the type described herein, can emit a simulated fan-tachometer signal in correspondence with an observed flow rate (or indicia thereof). For example, until a lower threshold flow rate (or indicia thereof) is observed by the flow-rate sensor, the sensor can emit a simulated fan-tachometer signal indicative of a given condition of a fan, for example, a stalled fan rotor. Between the lower threshold flow rate (or indicia thereof) and a selected upper threshold observed flow rate (or indicia thereof), the sensor can emit a corresponding simulated fan-tachometer signal indicative of a selected fan speed. As but one example, a correlation can be defined between simulated fan-tachometer speed and observed flow rate (or indicia thereof) between selected upper and lower threshold flow rates (or indicia thereof), as shown in FIG. 17. With such a pre-defined correlation, the sensor 330 can emit a simulated fan-tachometer signal correlated to (or encoding) a flow rate (or indicia thereof) observed by the sensor. The simulated fan-tachometer signal can be conveyed over a known bus using known protocols (e.g., an IPMI bus) and observed by a control system. The control system, in turn, can decode the simulated fan-tachometer signal using the known correlation (FIG. 17) between observed flow rate (or indicia thereof) and simulated fan speed.

Some flow-rate sensors can have an electrical circuit operatively coupled to an FG signal pin of a header and be configured to emit a simulated tachometer signal having a waveform similar to a waveform emitted by an operating (or stalled) fan. The electrical circuit (not shown) can be further configured to emit a simulated tachometer signal having a waveform similar to a failed or failing fan in response to an observed flow rate (or indicia thereof) below a selected lower threshold.

A flow-rate sensor can be operatively coupled to a control system associated with one or more pumps of the liquid-based heat-transfer system. The control system can emit a control signal for adjusting operation of one or more pumps in the fluid circuit (e.g., a cooling system) responsively to an observed proxy (or other) signal emitted by a flow-rate sensor.

For example, if the signal emitted by the flow-rate sensor indicates a lower-than-desired flow rate (e.g., based on an observed system workload, such as a microprocessor workload, or read/write traffic across a memory bus), the control system can emit a control signal. Such a control signal can cause a given one or more pump to increase speed, can cause a supplemental pump to become operational, and/or can cause a valve to open (or close), to increase flow rate through a desired portion of a cooling system. Such a control signal can alter an operational state of a computer system. For example, if additional system cooling is unavailable by increasing pump speed, opening a valve, or operating a supplemental pump, the computer system can reduce or limit workload of a subsystem at risk of overheating (e.g., microprocessor workload can be limited or reduced, read/write traffic across a memory bus can be limited or reduced) absent increased cooling.

As another example, if the signal emitted by the flow-rate sensor indicates a higher-than-necessary flow rate (e.g., based on an observed system workload, such as a microprocessor workload, or read/write traffic across a memory bus), the control system can emit a control signal. Such a control signal can cause a given one or more pumps to decrease speed (e.g., to save power and/or lower acoustic emissions by the pump), cause a supplemental pump to slow down or to stop operating, and/or cause a valve to open (or close), decreasing flow rate through a portion of a cooling system to a suitable level.

Other Multiplexed Proxies

As one generalized example, a sensor circuit can be configured to emit a proxy signal corresponding to an observed operational state. Each in a plurality of discrete proxy signals can correspond to each respective observed operational state in a plurality of observable operational states.

In some instances, such a proxy signal can be a simulated fan-tachometer signal. Each discrete simulated fan-tachometer signal can correspond to a respective observed operational state. For example, a simulated fan-tachometer signal corresponding to a fan speed of 200 RPM can constitute a proxy for a selected observed flow rate (or indicia thereof, such as, for example, a rate of increasing count of detected reflections from a reflective portion 35 of a rotational member 32). With such an example, a simulated fan-tachometer signal corresponding to a different fan speed (e.g., 250 RPM) can constitute a proxy for another (e.g., higher) observed flow rate (or indicia thereof) within the system 10.

As another example, a simulated fan-tachometer signal corresponding to a fan speed of 200 RPM can constitute a proxy for an observed first flow rate at a location within the system and a simulated fan-tachometer signal corresponding to a fan speed of 250 RPM can constitute a proxy for an observed second (e.g., different) flow rate. FIG. 17 shows an example, pre-defined correlation between simulated fan-tachometer signal and flow rate.

In some instances, a simulated fan-tachometer signal corresponding to a fan speed of 200 RPM can constitute a proxy for an observed leak at a first location within the system and a simulated fan-tachometer signal corresponding to a fan speed of 250 RPM can constitute a proxy for an observed leak at a second (e.g., different) location within the system.

Such proxy signals can be transmitted over and observed from, for example, the IPMI bus. A controller operatively coupled to the IPMI bus can observe the proxy signal, interpret the observed proxy signal, as by comparison to a lookup table, and, if appropriate, issue one or more selected system commands responsively to the observed or interpreted proxy signal.

By way of illustrate of disclosed principles, the following table summarizes specific examples of proxy signals, proxy signal values and corresponding operational states represented by the proxy signal values:

| PROXY SIGNAL | PROXY SIGNAL VALUE | CORRESPONDING OPERATIONAL STATE |
| --- | --- | --- |
| simulated fan-tachometer signal | 200 rpm | Leak at position "A" in system |
| | 250 rpm | leak at position "B" in system |
| | 300 RPM | Pump 1 failure |
| | 350 RPM | Pump 1 operating normally |
| | 400 RPM | Pump 2 failure |
| | 450 RPM | Pump 2 operating normally |
| | 500 RPM | Observed temperature (e.g., temperature of electronic component, pump motor, liquid coolant or air) over selected threshold or within a predefined range |
| | 550 RPM | Observed temperature (e.g., temperature of electronic component, pump motor, liquid coolant or air) over another selected threshold or within a different predefined range |

Computing Environments

Figure 18:
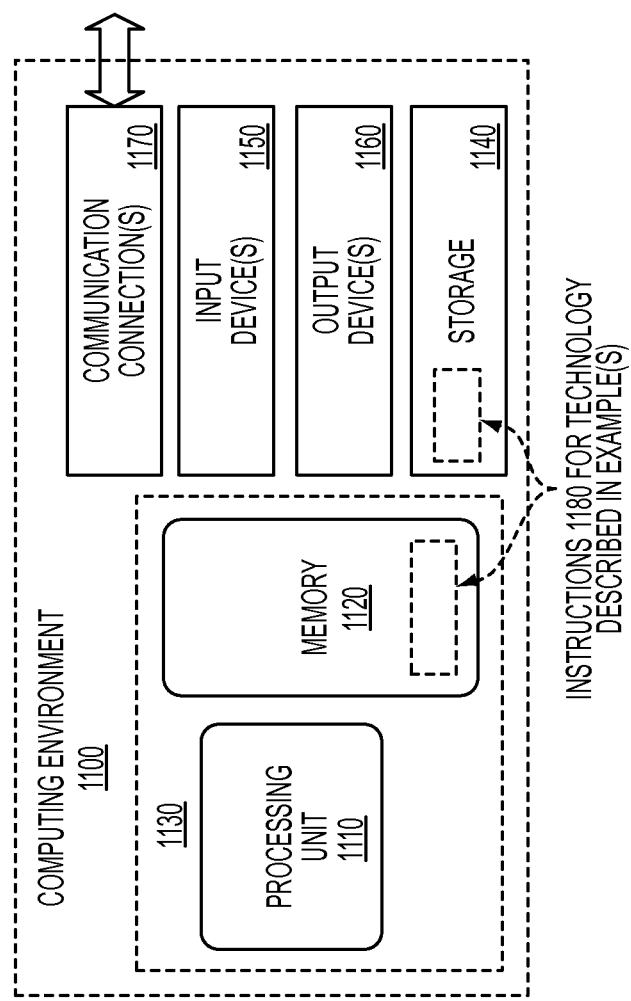
FIG. 18 shows a block diagram of a computing environment suitable for use in combination with systems, methods and apparatus described herein.

FIG. 18 illustrates a generalized example of a suitable computing environment 1100 in which described methods, embodiments, techniques, and technologies relating, for example, to control systems, may be implemented. The computing environment 1100 is not intended to suggest any limitation as to scope of use or functionality of the technology, as the technology may be implemented in diverse general-purpose or special-purpose computing environments. For example, the disclosed technology may be implemented with other computer system configurations, including hand held devices, multiprocessor systems, microprocessor-based or programmable consumer electronics, network PCs, minicomputers, mainframe computers, and the like. The disclosed technology may also be practiced in distributed computing environments where tasks are performed by remote processing devices that are linked through a communications network. In a distributed computing environment, program modules may be located in both local and remote memory storage devices.

With reference to FIG. 18, the computing environment 1100 includes at least one central processing unit 1110 and memory 1120. In FIG. 18, this most basic configuration 1130 is included within a dashed line. The central processing unit 1110 executes computer-executable instructions and may be a real or a virtual processor. In a multi-processing system, multiple processing units execute computer-executable instructions to increase processing power and as such, multiple processors can be running simultaneously. The memory 1120 may be volatile memory (e.g., registers, cache, RAM), non-volatile memory (e.g., ROM, EEPROM, flash memory, etc.), or some combination of the two. The memory 1120 stores software 1180 that can, for example, implement one or more of the innovative technologies described herein. A computing environment may have additional features. For example, the computing environment 1100 includes storage 1140, one or more input devices 1150, one or more output devices 1160, and one or more communication connections 1170. An interconnection mechanism (not shown) such as a bus, a controller, or a network, interconnects the components of the computing environment 1100. Typically, operating system software (not shown) provides an operating environment for other software executing in the computing environment 1100, and coordinates activities of the components of the computing environment 1100.

The storage 1140 may be removable or non-removable, and includes magnetic disks, magnetic tapes or cassettes, CD-ROMs, CD-RWs, DVDs, or any other medium which can be used to store information and which can be accessed within the computing environment 1100. The storage 1140 stores instructions for the software 1180, which can implement technologies described herein.

The input device(s) 1150 may be a touch input device, such as a keyboard, keypad, mouse, pen, or trackball, a voice input device, a scanning device, or another device, that provides input to the computing environment 1100. For audio, the input device(s) 1150 may be a sound card or similar device that accepts audio input in analog or digital form, or a CD-ROM reader that provides audio samples to the computing environment 1100. The output device(s) 1160 may be a display, printer, speaker, CD-writer, or another device that provides output from the computing environment 1100.

The communication connection(s) 1170 enable communication over a communication medium (e.g., a connecting network) to another computing entity. The communication medium conveys information such as computer-executable instructions, compressed graphics information, or other data in a modulated data signal. The data signal can include information pertaining to a physical parameter observed by a sensor or pertaining to a command issued by a controller, e.g., to invoke a change in an operation of a component in the system 10 (FIG. 1).

Computer-readable media are any available media that can be accessed within a computing environment 1100. By way of example, and not limitation, with the computing environment 1100, computer-readable media include memory 1120, storage 1140, tangible, non-transitory communication media (not shown), and combinations of any of the above.

Other Exemplary Embodiments

The examples described herein generally concern control systems, with specific examples of control systems being configured to respond to a detected condition or operational state of a liquid-based heat-transfer system, e.g., to issue an alert or other command responsive to a detected leak of a working fluid or to issue an alert or other command responsive to an observed flow rate of a working fluid. As but one example, a pump speed can be adjusted responsive to a signal emitted by a flow-rate sensor. The signal can be indicative of an observed flow rate of working fluid (or an indicia thereof, by way of example, a rotational speed of a rotational member within a segment of conduit). Other embodiments of leak detectors, flow-rate sensors, methods, circuits and/or control systems than those described above in detail are contemplated based on the principles disclosed herein, together with any attendant changes in configurations of the respective apparatus and/or circuits described herein. Incorporating the principles disclosed herein, it is possible to provide a wide variety of control systems configured to issue an alert or other command, and/or, based on a detected change in state or operation (e.g., a detected leak or change in observed flow rate), to adjust an operation of a wide variety of systems, including by way of example, a heat-transfer system for any of a data center, a laser component, a light-emitting diode, a chemical reactor, photovoltaic cells, solar collectors, and a variety of other industrial, military and consumer devices now known and hereafter developed. Moreover, systems disclosed above can be used in combination with other liquid-based systems including, inter alia, reactor vessels.

Directions and references (e.g., up, down, top, bottom, left, right, rearward, forward, etc.) may be used to facilitate discussion of the drawings and principles herein, but are not intended to be limiting. For example, certain terms may be used such as "up," "down,", "upper," "lower," "horizontal," "vertical," "left," "right," and the like. Such terms are used, where applicable, to provide some clarity of description when dealing with relative relationships, particularly with respect to the illustrated embodiments. Such terms are not, however, intended to imply absolute relationships, positions, and/or orientations. For example, with respect to an object, an "upper" surface can become a "lower" surface simply by turning the object over. Nevertheless, it is still the same surface and the object remains the same. As used herein, "and/or" means "and" or "or", as well as "and" and "or." Moreover, all patent and non-patent literature cited herein is hereby incorporated by references in its entirety for all purposes.

The principles described above in connection with any particular example can be combined with the principles described in connection with any one or more of the other examples. Accordingly, this detailed description shall not be construed in a limiting sense, and following a review of this disclosure, those of ordinary skill in the art will appreciate the wide variety of fluid heat exchange systems that can be devised using the various concepts described herein. Moreover, those of ordinary skill in the art will appreciate that the exemplary embodiments disclosed herein can be adapted to various configurations without departing from the disclosed principles.

The previous description of the disclosed embodiments is provided to enable any person skilled in the art to make or use the disclosed innovations. Those of ordinary skill in the art will appreciate that the exemplary embodiments disclosed herein can be adapted to various configurations and/or uses without departing from the disclosed principles. For example, the principles described above in connection with any particular example can be combined with the principles described in connection with another example described herein. Various modifications to those embodiments will be readily apparent to those skilled in the art, and the generic principles defined herein may be applied to other embodiments without departing from the spirit or scope of this disclosure. Accordingly, this detailed description shall not be construed in a limiting sense, and following a review of this disclosure, those of ordinary skill in the art will appreciate the wide variety of filtering and computational techniques can be devised using the various concepts described herein.

Similarly, the presently claimed inventions are not intended to be limited to the embodiments shown herein, but are to be accorded the full scope consistent with the language of the claims, wherein reference to an element in the singular, such as by use of the article "a" or "an" is not intended to mean "one and only one" unless specifically so stated, but rather "one or more". All structural and functional equivalents to the elements of the various embodiments described throughout the disclosure that are known or later come to be known to those of ordinary skill in the art are intended to be encompassed by the features described and claimed herein. Moreover, nothing disclosed herein is intended to be dedicated to the public regardless of whether such disclosure is explicitly recited in the claims. No claim element is to be construed under the provisions of 35 USC 112, sixth paragraph, unless the element is expressly recited using the phrase "means for" or "step for".

Thus, in view of the many possible embodiments to which the disclosed principles can be applied, we reserve the right to claim any and all combinations of features described herein, including the right to claim all that comes within the scope and spirit of the foregoing description, as well as within combinations recited in the following claims, literally and under the doctrine of equivalents.

The invention claimed is:

1. A control system, comprising:
a sensor, coupled to a fan header, configured to observe an operational parameter, and responsive thereto, to simulate an output signal of a tachometer, the simulated output signal being indicative of a rotational speed parameter, wherein the sensor is further configured to emit, over a communication channel, the simulated output signal as a proxy for the observed operational parameter, wherein the observed operational parameter is different from the rotational speed parameter; and
a controller to receive the simulated signal over the communication channel and to interpret the simulated signal as corresponding to a state of the observed operational parameter.

2. A control system according to claim 1, wherein the controller is further configured to emit a command signal responsive to the state of the observed operational parameter.

3. A control system according to claim 1, wherein the simulated signal of the tachometer comprises a simulated fan-tachometer signal or a simulated pump speed signal.

4. A control system according to claim 3, wherein the sensor comprises a leak detector, and wherein the observed operational parameter comprises a detected presence or a detected absence of a leak by the leak detector.

5. A control system according to claim 4, wherein the leak detector comprises a sensitive region, wherein the sensitive region is operatively coupled to a printed circuit board adjacent a component susceptible to wetting by a working fluid if a leak of the working fluid occurs.

6. A control system according to claim 4, wherein the observed operational parameter further comprises a location of a detected presence of a leak, and wherein the sensor is configured to simulate a first output signal of a tachometer corresponding to a first location, and a second output signal of a tachometer corresponding to a second location, wherein the first output signal has a different frequency than the second output signal.

7. A control system according to claim 3, wherein the sensor comprises a flow-rate sensor, and wherein the observed operational parameter comprises an indicia of a rate-of-flow of a fluid.

8. A control system according to claim 1, wherein the observed operational parameter consists of one or more of an indicia of temperature, an indicia of pressure, an indicia of electrical conductance, and an indicia of a presence or absence of a leak.

9. A control system according to claim 1, wherein the observed operational parameter comprises an indicia of a presence or absence of a working fluid externally of a liquid-based heat-transfer system, wherein the sensor comprises an electrical circuit configured to emit the simulated signal responsive to the indicia of a presence of the working fluid externally of the liquid-based heat transfer system.

10. A control system according to claim 9, wherein the electrical circuit is further configured to emit the simulated signal responsive to the indicia indicating an absence of the working fluid externally of the liquid-based heat transfer system.

11. A control system according to claim 10, wherein the signal responsive to the indicia indicating a presence of the working fluid externally of the liquid-based heat transfer system comprises an interruption to the simulated signal.

12. A control system according to claim 9, wherein the simulated signal comprises an interruption to at least one electrical coupling between a pump and the fan header.

13. A control system according to claim 12, wherein the at least one electrical coupling between the fan pump and the fan header comprises a first electrical coupling between a first pump and a first fan header and a second electrical coupling between a second pump and a second fan header.

14. A control system according to claim 12, wherein the electrical coupling comprises an electrical current for powering the pump, a PWM signal for controlling the pump, or an FG signal for monitoring operation of the pump.

15. A control system according to claim 1, wherein the observed operational parameter comprises an indicia of a flow rate of a working fluid in a liquid-based heat-transfer system, wherein the sensor comprises an electrical circuit configured to emit the simulated signal in correspondence with the indicia of the flow rate.

16. A control system according to claim 1, wherein the controller is configured to interrupt at least one electrical coupling between a pump and the fan header responsive to a predefined state of the observed operational parameter.

17. A control system according to claim 16, wherein, responsive to the predefined state of the observed operational parameter, the controller is configured to alter a supply of power to the pump, wherein the simulated signal comprises a frequency generator (FG) signal output by the pump.

18. A control system according to claim 16, wherein, responsive to the predefined state of the observed operational parameter, the interruption of the at least one electrical coupling between the pump and the fan header comprises an interruption to a pulse width modulated (PWM) signal to the pump with an alternative PWM signal to the pump configured to change a pump speed, wherein the simulated signal comprises a frequency generator (FG) signal output by the pump responsive to the alternative PWM signal.

19. A control system according to claim 16, wherein, responsive to the predefined state of the observed operational parameter, the interruption of the at least one electrical coupling between the pump and the fan header comprises an interruption to a frequency generator (FG) signal output by the pump with the simulated signal comprising an alternative FG signal to an FG pin of the fan header.

20. A control system according to claim 1, wherein the simulated signal comprises a simulated reproduction of a waveform emitted by a properly or an improperly operating, or a failed, fan or pump.

21. A control system according to claim 1, wherein the communication channel comprises an intelligent platform management initiative (IPMI) communication bus.

22. A control system according to claim 1, wherein the observed operational parameter further comprises an operational state of a pump, and wherein the sensor is configured to simulate a first output signal of a tachometer corresponding to a failed state of the pump, and a second output signal of a tachometer corresponding to an operating state of the pump, wherein the first output signal has a different frequency than the second output signal.

23. A control system according to claim 22, wherein the observed operational parameter further comprises an identification of one of a plurality of pumps, and wherein the first output signal corresponds to a failed state of a first pump, the second output signal of a tachometer corresponds to an operating state of the first pump, wherein the sensor is configured to simulate a third output signal of a tachometer corresponding to a failed state of a second pump, and a fourth output signal of a tachometer corresponding to an operating state of the second pump, wherein the first, second, third, and fourth output signals each has a different respective frequency than the other output signals.

24. A control system according to claim 1, wherein the sensor comprises a temperature sensor and the observed operational parameter further comprises an observed temperature, and wherein the sensor is configured to simulate a first output signal of a tachometer corresponding to a first temperature, and a second output signal of a tachometer corresponding to a second temperature, wherein the first output signal has a different frequency than the second output signal.

25. A method of detecting a leak of a working fluid from a liquid-based heat-transfer system, the method comprising:
   sensing a presence or an absence of a working fluid externally of a liquid-based heat-transfer system with a sensor coupled to a fan header;
   simulating an output signal of a tachometer, the simulated output signal simulating a tachometer signal indicative of a selected rotational speed in correspondence with the sensed absence or the sensed presence of the working fluid;
   monitoring the simulated output signal; and
   interpreting a presence or an absence of the working fluid externally of the liquid-based heat-transfer system from the selected rotation speed of the simulated output signal.

26. A method according to claim 25, further comprising emitting a signal responsive to the monitored simulated output signal corresponding to a sensed presence of the working fluid.

27. A method according to claim 26, wherein the emitted signal comprises an alert to a system administrator.

28. A method according to claim 26, wherein the emitted signal comprises a command to a control system.

29. A method according to claim 25, wherein the selected rotation speed corresponds to an actual rotational speed of a fan or pump.

30. A method according to 25, wherein the simulated output signal in the sensed absence of the working fluid comprises a simulated tachometer signal of the type emitted by an operable fan or pump.

31. A method according to claim 25, wherein the simulated output signal in the sensed presence of the working fluid comprises a simulated tachometer signal of the type emitted by an inoperable fan or pump.

32. A computer system, comprising:
   a fluid conduit configured to convey a liquid therethrough;
   a sensor configured to detect a presence of the liquid externally of the conduit;
   an electrical circuit operatively coupled to the sensor and being configured to emit a signal responsive to a detected presence of the liquid externally of the conduit, wherein the electrical circuit is further configured to simulate an output signal of a tachometer, the simulated output signal being indicative of a rotational speed parameter, and to emit the simulated output signal indicative of a selected rotation speed absent a detected presence of the liquid externally of the conduit;
   a control circuit to interpret, from the selected rotation speed, a presence or an absence of the liquid externally of the conduit; and
   a fan header and a pump electrically coupled to the header, wherein the electrical circuit is configured to interrupt at least one electrical coupling between the pump and the header in response to a detected presence of the liquid externally of the conduit.

33. A computer system according to claim 32, wherein the signal responsive to a presence of the liquid externally of the conduit comprises an interruption to the simulated output signal.

34. A computer system according to claim 32, wherein the signal responsive to the detected presence of the liquid externally of the conduit comprises an interruption to the at least one electrical coupling between the pump and the fan header.

35. A computer system according to claim 32, further comprising a printed circuit board, wherein the sensor comprises a sensitive region operatively coupled to the printed circuit board at a position adjacent a component susceptible to wetting by the liquid if a leak of the liquid from the conduit occurs.

36. A computer system according to claim 32, wherein the electrical circuit comprises:
   a leak detection circuit configured to receive a signal from the sensor indicative of a leak, and to emit a signal on a leak sense line responsive to the signal received from the sensor;
   a glue logic module configured to monitor the leak sense line for a signal indicative of a leak and to output at least one of: a signal to interrupt power to the pump and an interruption to a frequency generator (FG) signal output by the header with the simulated signal comprising an alternative FG signal; and an enable detect line configured to carry a signal transmitted from the glue logic module to the leak detection circuit, wherein the leak detection circuit becomes operative responsive to receiving the signal on the enable detect line.

37. A control system, comprising:

a sensor configured to observe an operational parameter, and responsive thereto, to simulate an output signal of a tachometer, the simulated output signal being indicative of a rotational speed parameter, wherein the sensor is further configured to emit, over a communication channel, the simulated output signal as a proxy for the observed operational parameter, wherein the observed operational parameter is different from the rotational speed parameter; and a controller to receive the simulated signal over the communication channel, to interpret the simulated signal as corresponding to a state of the observed operational parameter, and to interrupt at least one electrical coupling between a pump and a fan header responsive to a predefined state of the observed operational parameter.

38. A control system according to claim 37, wherein the sensor comprises an electrical circuit configured to observe the operational parameter comprising an indicia of a presence or absence of a working fluid externally of a liquid-based heat-transfer system, and configured to simulate the output signal of a tachometer responsive to the indicia of a presence of the working fluid externally of the liquid-based heat transfer system.

39. A control system according to claim 38, wherein the observed operational parameter comprises an indicia of a flow rate of a working fluid in a liquid-based heat-transfer system, wherein the sensor is configured to emit the simulated signal in correspondence with the indicia of the flow rate.

40. A control system according to claim 38, wherein the electrical circuit is further configured to emit the simulated signal responsive to the indicia indicating an absence of the working fluid externally of the liquid-based heat transfer system.

41. A control system according to claim 38, wherein the signal responsive to the indicia indicating a presence of the working fluid externally of the liquid-based heat transfer system comprises an interruption to the simulated signal.

42. A control system according to claim 37, wherein the controller is further configured to emit a command signal responsive to the state of the observed operational parameter.

43. A control system according to claim 42, wherein the simulated signal of the tachometer comprises a simulated fan-tachometer signal or a simulated pump speed signal.

44. A control system according to claim 37, wherein the sensor comprises a flow-rate sensor, and wherein the observed operational parameter comprises an indicia of a rate-of-flow of a fluid.

45. A control system according to claim 37, wherein the observed operational parameter consists of one or more of an indicia of temperature, an indicia of pressure, an indicia of electrical conductance, and an indicia of a presence or absence of a leak.

46. A control system according to claim 37, wherein the sensor comprises a leak detector, and wherein the observed operational parameter comprises a detected presence or a detected absence of a leak by the leak detector.

47. A control system according to claim 37, wherein the simulated signal comprises a simulated reproduction of a waveform emitted by a properly or an improperly operating, or a failed, fan or pump.

48. A control system according to claim 37, wherein the electrical coupling comprises an electrical current for powering the pump, a PWM signal for controlling the pump, or an FG signal for monitoring operation of the pump.

* * * * *